(12) United States Patent
Rengarajan et al.

(10) Patent No.: US 10,447,510 B1
(45) Date of Patent: Oct. 15, 2019

(54) ON-DEMAND FEED FORWARD EQUALIZER WITH DISTRIBUTED ARITHMETIC ARCHITECTURE AND METHOD

(71) Applicant: GLOBALFOUNDRIES INC., Grand Cayman (KY)

(72) Inventors: Krishnan S. Rengarajan, Bangalore (IN); Vaibhav A. Ruparelia, Bengaluru (IN); Panduga Shiva Shankar Reddy, Nagarkurnool (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/266,707

(22) Filed: Feb. 4, 2019

(51) Int. Cl.
*H03H 7/30* (2006.01)
*H04L 25/03* (2006.01)
*H04L 27/38* (2006.01)

(52) U.S. Cl.
CPC ........ *H04L 25/03076* (2013.01); *H04L 27/38* (2013.01)

(58) Field of Classification Search
CPC .................. H04L 25/03076; H04L 27/38
See application file for complete search history.

(56) References Cited

U.S. PATENT DOCUMENTS

| | | | |
|---|---|---|---|
| 7,107,301 B2 | 9/2006 | Rylov et al. | |
| 8,238,467 B2 | 8/2012 | Dally | |
| 8,311,147 B2 | 11/2012 | Dally | |
| 8,831,074 B2 | 9/2014 | Agazzi et al. | |
| 9,036,689 B2 | 5/2015 | Bae et al. | |
| 2005/0201457 A1 | 9/2005 | Allred et al. | |
| 2013/0259112 A1* | 10/2013 | Bae | H04L 25/03891 375/232 |
| 2014/0273901 A1* | 9/2014 | Liu | H04W 52/0238 455/226.1 |

OTHER PUBLICATIONS

Keerthi et al., "FPGA Implementation of Distributed Arithmetic for FIR Filter," International Journal of Engineering Research & Technology (IJERT), vol. 1, Issue 9, 2012, pp. 1-8.

(Continued)

*Primary Examiner* — Dhaval V Patel
(74) *Attorney, Agent, or Firm* — Gibb & Riley, LLC; David A. Cain, Esq.

(57) ABSTRACT

Disclosed is a power-optimized distributed arithmetic (DA)-based feed forward equalizer (FFE) that performs on-demand equalization processing of a data sample. Specifically, a data stream is represented by digital words, which indicate signal levels at taps on a transmission medium. A screener applies formulas to selected taps as opposed to all taps (e.g., to the main cursor tap, which corresponds to the current data sample, and to specific pre-cursor and post-cursor taps, which correspond to immediately proceeding and following data samples) to determine whether the current data sample (which should indicate a specific two-bit symbol) has degraded during transmission to a point where equalization processing is required. If so, a bypass flag is set to a first level so that the data sample is subjected to equalization processing. If not, the bypass flag is set to a second level so that such processing is bypassed. Also disclosed is a corresponding method.

20 Claims, 9 Drawing Sheets

(56) References Cited

OTHER PUBLICATIONS

Smruti Santa Swain, "Implementation of FIR Filter using Distributed Arithmetic Method," Thesis, National Institute of Technology Rourkela, Department of Electronics and Communications Engineering, 2015, pp. 1-40.

Hwang et al., "New Distributed Arithmetic Algorithm for Low-Power FIR Filter Implementation," IEEE Signal Processing Letters, vol. 11, No. 5, 2004, pp. 463-466.

Zhou et al., "A Low Power FIR Filter Structure Based on a Modified Distributed Arithmetic Algorithm," College of Information Science and Engineering, Ningbo University, The Key Program of National Science of China (No. 61131001), pp. 1-4.

Raghunadha Reddy et al., "ASIC Implementation of Distributed Arithmetic in Adaptive FIR Filter," International Conference on Circuits Power and Computing Technologies (ICCPCT), 2017, pp. 1-4.

Chen et al., "Power Optimized ADC-Based Serial Link Receiver," IEEE Journal of Solid-State Circuits, vol. 47, No. 4, 2012, pp. 938-951.

Bowlyn et al., "A Novel Distributed Arithmetic Multiplierless Approach for Computing Complex Inner Products," International Conference on Parallel and Distributed Processing Techniques and Applications, 2015, pp. 606-612.

Mohammad Al Mahdi Eshtawie, "Distributed Arithmetic Technique Analysis, Design and Applications," The Second Symposium on Theories and Applications of Basic and Biosciences, 2015, pp. 56-65.

Hanumolu et al., "Equalizers for High-Speed Serial Links," International Journal of High Speed Electronics and Systems, vol. 15, No. 2, 2005, pp. 175-204.

Patil et al., "An Analysis on FIR Filter-Efficiency (FFE)," International Journal of Electrical, Electronics and Computer Systems (IJEECS), 2016, Abstract.

Naik et al., "An Efficient Reconfigurable FIR Digital Filter Using Modified Distribute Arithmetic Technique," International Journal of Emerging Technology and Advanced Engineering, vol. 5, Issue 6, 2015, pp. 152-156.

Sridharan et al., "Introduction to Distributed Arithmetic," www.ee.iitm.ac.in/vlsi/_media/iep2010/da.pdf, Accessed on Oct. 30, 2018, pp. 1-24.

Stanley A. White, "Applications of Distributed Arithmetic to Digital Signal Processing: A Tutorial Review," IEEE ASSP Magazine, 1989, pp. 4-19.

Yazhini et al., "FIR Filter Implementation using Modified Distributed Arithmetic Architecture," Indian Journal of Science and Technology, vol. 6, Issue 5, 2013, 4485-4491.

Zhang et al., "PAM4 Signaling for 56G Serial Link Applications—A Tutorial," UBM Design Con, 2016, pp. 1-91.

Ayman Osama Amin Mohamed Shafik, "Equalization Architectures for High Speed ADC-Based Serial I/O Receivers," Dissertation, Texas A&M University, 2016, pp. 70-77.

* cited by examiner

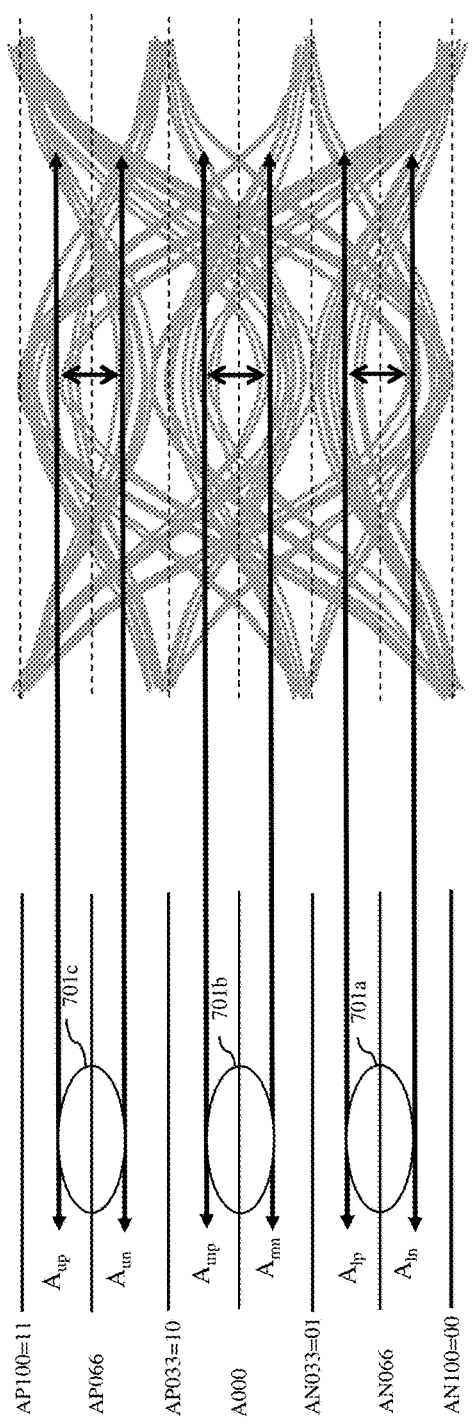
FIG. 7A
FIG. 7B
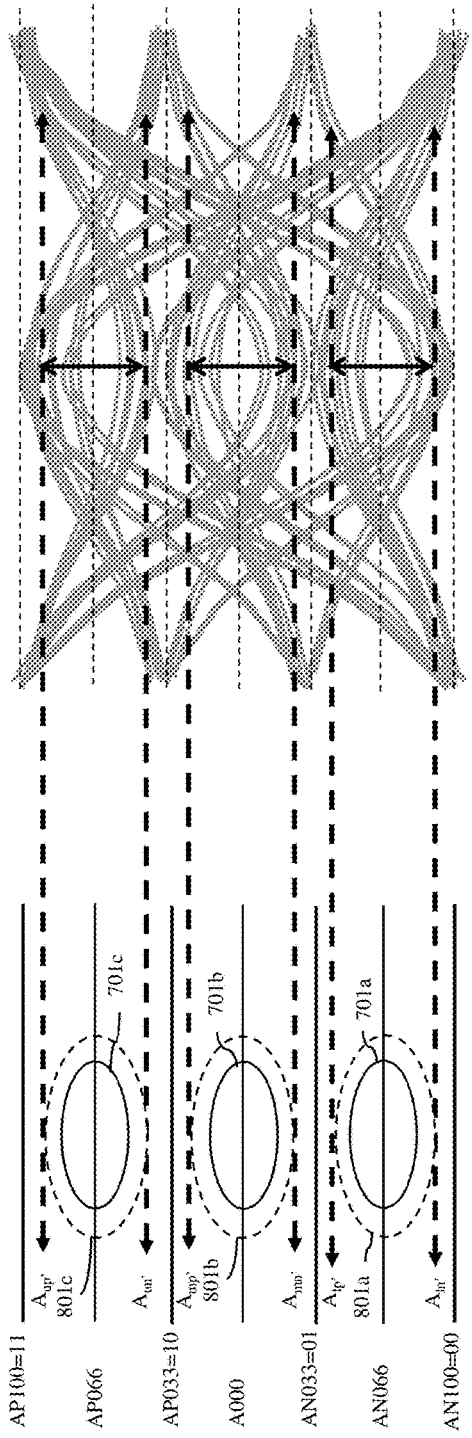
FIG. 8A
FIG. 8B

ON-DEMAND FEED FORWARD EQUALIZER WITH DISTRIBUTED ARITHMETIC ARCHITECTURE AND METHOD

BACKGROUND

Field of the Invention

The present invention relates to feed forward equalizers (FFEs) for data link receivers and, more particularly, to a FFE configuration optimized for reduced power consumption and a corresponding feed forward equalization method.

Description of Related Art

A feed forward equalizer (FFE) is often incorporated into a data link receiver (RX), such as a level-4 pulse amplitude modulation (PAM-4) data receiver, to correct for signal degradation. Specifically, those skilled in the art will recognize that a PAM-4 signal includes four distinct levels of pulse modulation (i.e., four pulse amplitudes at different voltage levels) and used to convey information. Each of the four different amplitude levels corresponds to a different two-bit symbol (i.e., 00, 01, 10, and 11). Transmission, by a data link transmitter (TX), of a two-bit symbol in a given bit period (T) (also referred to herein as a symbol period) effectively represents the transmission of two data bits, in parallel, such that the data transmission rate is effectively doubled relative to PAM-2 (also called Non-Return to Zero or NRZ transmission). FIG. 1A is a voltage diagram illustrating an exemplary PAM-4 signal with a lowest voltage level (i.e., voltage level 1) representing the two-bit symbol 00, a next to lowest voltage level (i.e., voltage level 2) representing the two-bit symbol 01, a next to highest voltage level (i.e., voltage level 3) representing the two-bit symbol 10, and the highest voltage level (i.e., voltage level 4) representing the two-bit symbol 11. FIG. 1B is an exemplary "eye diagram" of a PAM-4 output signal from a TX. As illustrated, this PAM-4 output signal includes three vertically stacked ellipse-shaped signal-free regions (referred to herein as "eyes") within a bit period (T) and four distinct levels of pulse modulation above and below the ellipse-shaped regions. These include two pulse modulation levels AN100 and AN033 below the mid-point (A000) of the diagram and representing the two-bit symbols 00 and 01, respectively, and two pulse modulation levels AP033 and AP100 above A000 and representing the two-bit symbols 10 and 11, respectively.

PAM-4 signals are, however, particularly susceptible to noise degradation during transmission. FIG. 1C illustrates signal loss at the RX, as evidenced by the closing of the "eyes" within the eye pattern (i.e., the reduction in size of the ellipse-shaped regions). More specifically, FIG. 2A illustrates an exemplary transmission pulse (referred to herein as an impulse response), which represents two-bit symbol. FIG. 2B shows how that impulse response is smeared, during transmission, such that the signal level for each received two-bit symbol is corrupted by the signal levels for the previously received two-bit symbols and for the subsequently received two-bit symbols.

Consequently, within a PAM-4 receiver (RX), a received PAM-4 signal will initially be processed by an analog front end (AFE), which can include, but is not limited to, an amplifier and a continuous time linear equalizer (CTLE). Furthermore, the output of the AFE will be digitized through analog-to-digital conversion and then equalized using a feed forward equalizer (FFE), which corrects for signal loss by reducing the smear (as shown in FIG. 2C) and thereby reopening the "eye pattern" (as shown in FIG. 1D). Specifically, to correct for signal loss of a current data sample, which should represent a specific transmitted two-bit symbol and which is captured from a main cursor tap on a transmission medium, the FFE looks at data samples captured at other taps and, particularly, data samples captured before and after the current data sample (i.e., looks at data samples from pre-cursor and post-cursor taps on either side of a main cursor tap) and applies appropriate corrections that were determined earlier through a channel assessment algorithm while running standard training sequences. These corrections comprise channel coefficients determined by the channel assessment algorithm corresponding to each data sample before and after the current data sample. The coefficient weighted corrections on the pre- and post-cursor tap data samples when applied to the current data sample from the main cursor tap lead to the removal or reduction of the inter-symbol interference (i.e., the effect of smear from the neighboring two-bit symbols (in time)). Thus, the current data sample's digital value (i.e., the two-bit symbol indicated by the current data sample) corresponding to the analog level before FFE) is corrected to a new value that would ideally represent the correct digital value after compensation for the channel impulse response. While currently available FFE architectures are suitable for performing the required equalization process within receivers, improvements and/or modifications that enable device size scaling, power optimization and faster operating speeds are generally considered desirable.

SUMMARY

In view of the foregoing, disclosed herein are embodiments of a power-optimized distributed arithmetic (DA)-based feed forward equalizer (FFE). The FFE embodiments are configured to perform DA-based feed forward equalization processing of a data sample from an incoming data stream only when necessary (i.e., on-demand) in order to save power. To accomplish this, the FFE can include a screener (i.e., a screening logic block). The screener can evaluate the data sample (which should represent a specific transmitted two-bit symbol) in real-time to determine whether or not equalization processing is necessary. Specifically, the data stream can be represented by multiple digital words, which indicate different signal levels at different taps on a transmission medium. The screener can apply a set of formulas to analyze selected ones of the digital words and, particularly, the digital words that represent the signal levels on at least the main cursor tap (which corresponds to the data sample at issue, also referred to as the current data sample), the first pre-cursor tap (which corresponds to the immediately preceding data sample) and the first post-cursor taps (which corresponds to the immediately following data sample) to determine whether or not the current data sample has degraded during transmission to a point where equalization processing is required. If so, the screener can set a bypass flag to a first level so that the current data sample is automatically subjected to DA-based feed forward equalization processing. If not, the screener can set the bypass flag to a second level so that equalization processing is bypassed. Significant power savings can be achieved by the disclosed DA architecture because the DA-based feed forward equalization processing is only performed on-demand. Also disclosed herein are embodiments of a corresponding power-optimized distributed arithmetic (DA)-based feed forward equalization method.

More specifically, each embodiment of a power-optimized distributed arithmetic (DA) feed forward equalizer (FFE) disclosed herein can include a retimer that receives digital words from analog-to-digital converters at successive unit intervals (UI). The digital words can represent an incoming data stream and can indicate different signal levels at different taps on a transmission medium. The retimer can hold and subsequently forward groups of digital words on to one or more address generators for use, if necessary, during subsequent on-demand equalization processing. Each FEE can further include a screener (i.e., a screening logic block), which evaluates a current data sample in the data stream in real-time to determine whether or not that data sample (which should represent a specific transmitted two-bit symbol) has degraded during transmission to a point where equalization processing is required. Specifically, the screener can analyze (i.e., apply a set of formulas to) selected ones of the digital words including at least the digital words representing the signal levels on the main cursor tap (which corresponds to the data sample at issue, also referred to as the current data sample), a first pre-cursor tap (which corresponds to an immediately preceding data sample in the data stream) and a first post-cursor tap (which corresponds to an immediately following data sample in the data stream). Based on the results of this evaluation process, the screener can set a bypass flag to either a first level or a second level. Each FFE can further include a DA-based feed forward equalization processing block. Setting the bypass flag at the first level can cause (i.e., can trigger) DA-based feed forward equalization processing of the current data sample to be performed by the DA-based feed forward equalization processing block. Setting the bypass flag at the second level can cause such DA-based feed forward equalization processing of the current data sample to be bypassed.

It should be noted that when DA-based feed forward equalization processing of a current data sample is bypassed (i.e., when the bypass flag is at the second level), a fixed value register can be used to insert a fixed value digital word into additional logic downstream of the DA architecture. This fixed value digital word can correspond to a predetermined acceptable level-4 pulse amplitude modulation (PAM-4) signal level for the current data sample (i.e., it can correspond to the specific PAM-4 signal level that the data signal belongs to) and can be inserted into the additional logic to facilitate subsequent signal processing.

It should be understood that the embodiments of a DA FFE will typically include multiple DA FFE slices (configured as described above) that operate in parallel (e.g., to process different groups of digital inputs from substantially overlapping sub-sets of analog-to-digital converters (ADCs) within a larger set of ADCs). Additionally, within a DA FFE slice the DA-based feed forward processing block can include multiple processing sections to allow for parallel processing of relatively small groups of the digital words (e.g., from lower order taps and higher order taps) received by the retimer in that DA FFE slice.

For example, in one particular embodiment, a DA FFE can include sixteen DA FFE slices that operate in parallel to process sixteen different groups of digital words (e.g., from sixteen substantially overlapping sub-sets of ADCs within a larger set of thirty-two ADCs 0-32). One slice can receive and process digital words from ADCs 0-15, another can receive and process digital words from ADCs 1-16, another can receive and process digital words from ADCs 2-17, and so on. Additionally, each slice can include a DA-based feed forward equalization processing block that includes a first processing section and a second processing section. The first processing section can include a first address generator and a set of distributed arithmetic look-up tables (LUTs) for processing those digital words that represent a lower order portion of a data stream and indicate the analog signal levels sampled at the first eight taps (i.e., the lower order taps) on a transmission medium and converted to digital by the first eight ADCs. The second processing section can include a second address generator and a second set of DA LUTs for processing those digital words that represent a higher order portion of the data stream and indicate the analog signal levels sampled at the next eight taps (i.e., the higher order taps) on the transmission medium and converted to digital by the next eight ADCs.

In this case, each slice can include a retimer, which receives the digital words from the sixteen ADCs at successive UIs. The retimer can hold the digital words as they are received until the first eight digital words from the first eight ADCs are received and can then forward those first eight digital words on to the first address generator for use, if necessary, during subsequent on-demand equalization processing in the first processing section. The retimer can again hold the digital words as they are received until the next eight digital words from the next eight ADCs are received and can then forward the next eight digital words on to the second address generator for use, if necessary, during subsequent on-demand equalization processing in the second processing section.

This slice can further include a screener (i.e., a screening logic block), which evaluates a current data sample in the data stream in real-time to determine whether or not that data sample (which should represent a specific transmitted two-bit symbol) has degraded during transmission to a point where equalization processing is required. Specifically, the screener can analyze (i.e., apply a set of formulas to) selected ones of the digital words including at least the digital words representing the signal levels on the main cursor tap (which corresponds to the data sample at issue, also referred to as the current data sample), a first pre-cursor tap (which corresponds to an immediately preceding data sample in the data stream) and a first post-cursor tap (which corresponds to an immediately following data sample in the data stream). Based on the results of this evaluation process, the screener can set a bypass flag to either a first level or a second level. Each FFE can further include a DA-based feed forward equalization processing block. Setting the bypass flag at the first level can cause (i.e., can trigger) DA-based feed forward equalization processing of the current data sample to be performed by the DA-based feed forward equalization processing block. Setting the bypass flag at the second level can cause such DA-based feed forward equalization processing of the current data sample to be bypassed.

Again, it should be noted that when DA-based feed forward equalization processing of a current data sample is bypassed (i.e., when the bypass flag is at the second level), a fixed value register can be used to insert a fixed value digital word into additional logic downstream of the DA architecture. This fixed value digital word can correspond to a predetermined acceptable level-4 pulse amplitude modulation (PAM-4) signal level for the current data sample (i.e., it can correspond to the specific PAM-4 signal level that the data signal belongs to) and can be inserted into the additional logic to facilitate subsequent signal processing.

Also disclosed herein are embodiments of a power-optimized distributed arithmetic (DA)-based feed forward equalization method. Generally, the method can include receiving, by a retimer of a feed forward equalizer (FFE), digital words from analog-to-digital converters (ADCs) at the successive UIs. The digital words can represent an incoming data stream and can indicate different signal levels at different taps on a transmission medium. The method can further include using the retimer to hold and subsequently forward groups of digital words on to one or more address generators for use, if necessary, during subsequent on-demand DA-based feed forward equalization processing. The method can further include evaluating, by a screener (i.e., a screening logic block) of the FFE, a current data sample in the data stream in real-time to determine whether or not that data sample (which should represent a specific transmitted two-bit symbol) has degraded during transmission to a point where equalization processing is required. Specifically, the method can include using the screener to analyze (i.e., to apply a set of formulas to) selected ones of the digital words including at least those digital words representing the signal levels on the main cursor tap (which corresponds to the data sample at issue, also referred to as the current data sample), a first pre-cursor tap (which corresponds to an immediately preceding data sample in the data stream) and a first post-cursor tap (which corresponds to an immediately following data sample in the data stream). The method can further include setting, by the screener, a bypass flag to either a first level or a second level based on the results. When the bypass flag is set at the first level, distributed arithmetic (DA)-based feed forward equalization processing of the data sample can be performed by a DA-based Feed forward equalization processing block. When the bypass flag is set at the second level, the DA-based feed forward equalization processing of the data sample can be bypassed.

It should be noted that the method can further include, when DA-based feed forward equalization processing of a current data sample is bypassed (i.e., when the bypass flag is at the second level), using a fixed value register to insert a fixed value digital word into additional logic downstream of the DA architecture. This fixed value digital word can correspond to a predetermined acceptable level-4 pulse amplitude modulation (PAM-4) signal level for the current data sample (i.e., it can correspond to the specific PAM-4 signal level that the data signal belongs to) and can be inserted into the additional logic to facilitate subsequent signal processing.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 7A-7B illustrates defined ellipse shapes within an eye diagram; and

FIGS. 8A-8B illustrated expanded ellipse shapes, including a margin of error, within a diagram.

DETAILED DESCRIPTION

Figure 1A:
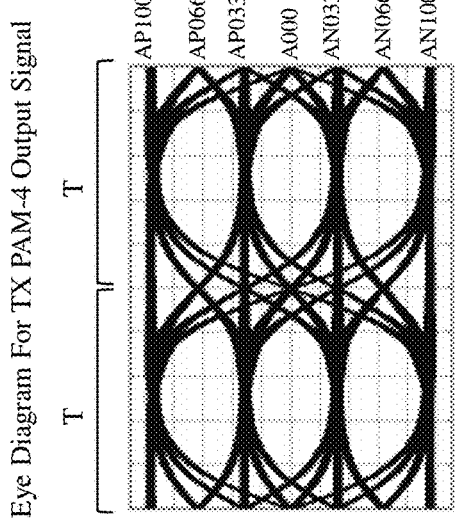
FIG. 1A is a voltage diagram illustrating signal levels of an exemplary level-4 pulse amplitude modulation (PAM-4) signal.
Figure 1B:
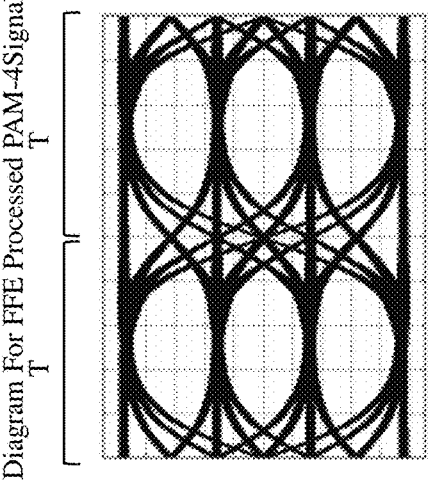
FIG. 1B is an eye diagram illustrating an exemplary PAM-4 signal.
Figure 1C:
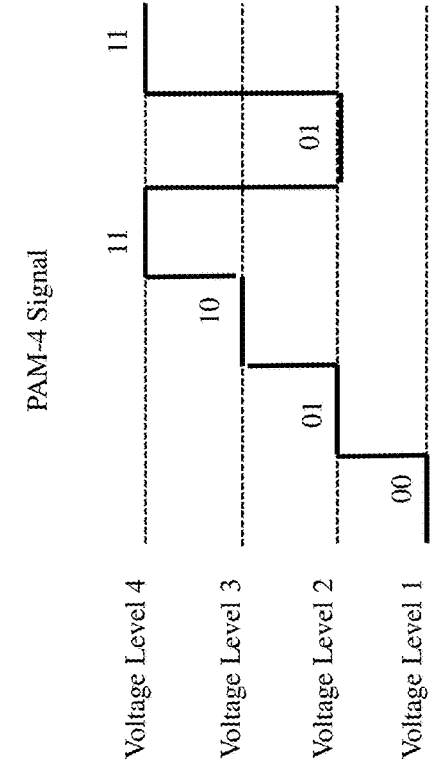
FIG. 1C is an eye diagram illustrating an exemplary degraded PAM-4 signal.
Figure 1D:
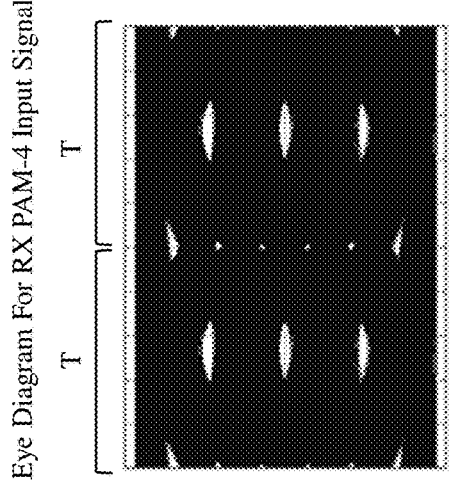
FIG. 1D is an eye diagram illustrating an exemplary corrected PAM-4 signal.
Figure 2A:
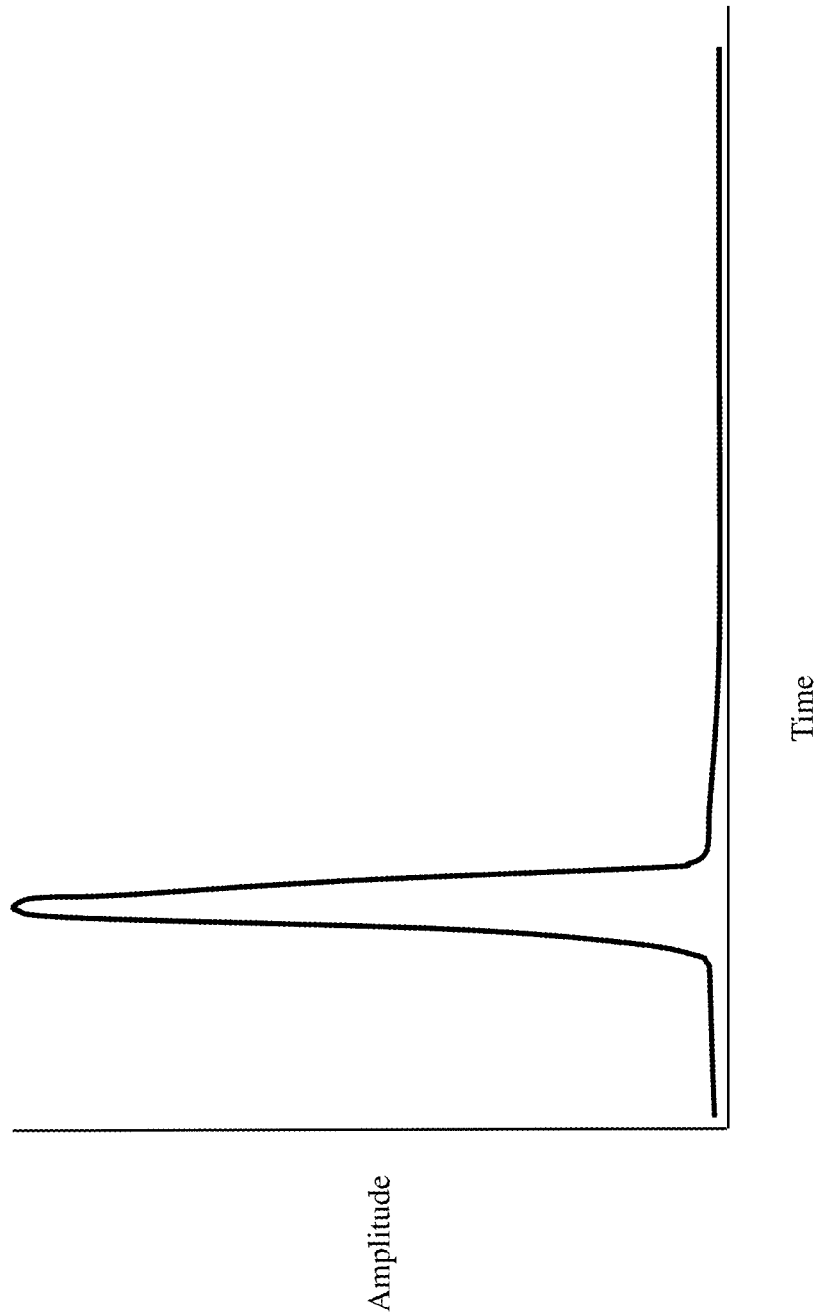
FIG. 2A illustrates an exemplary transmission pulse.
Figure 2B:
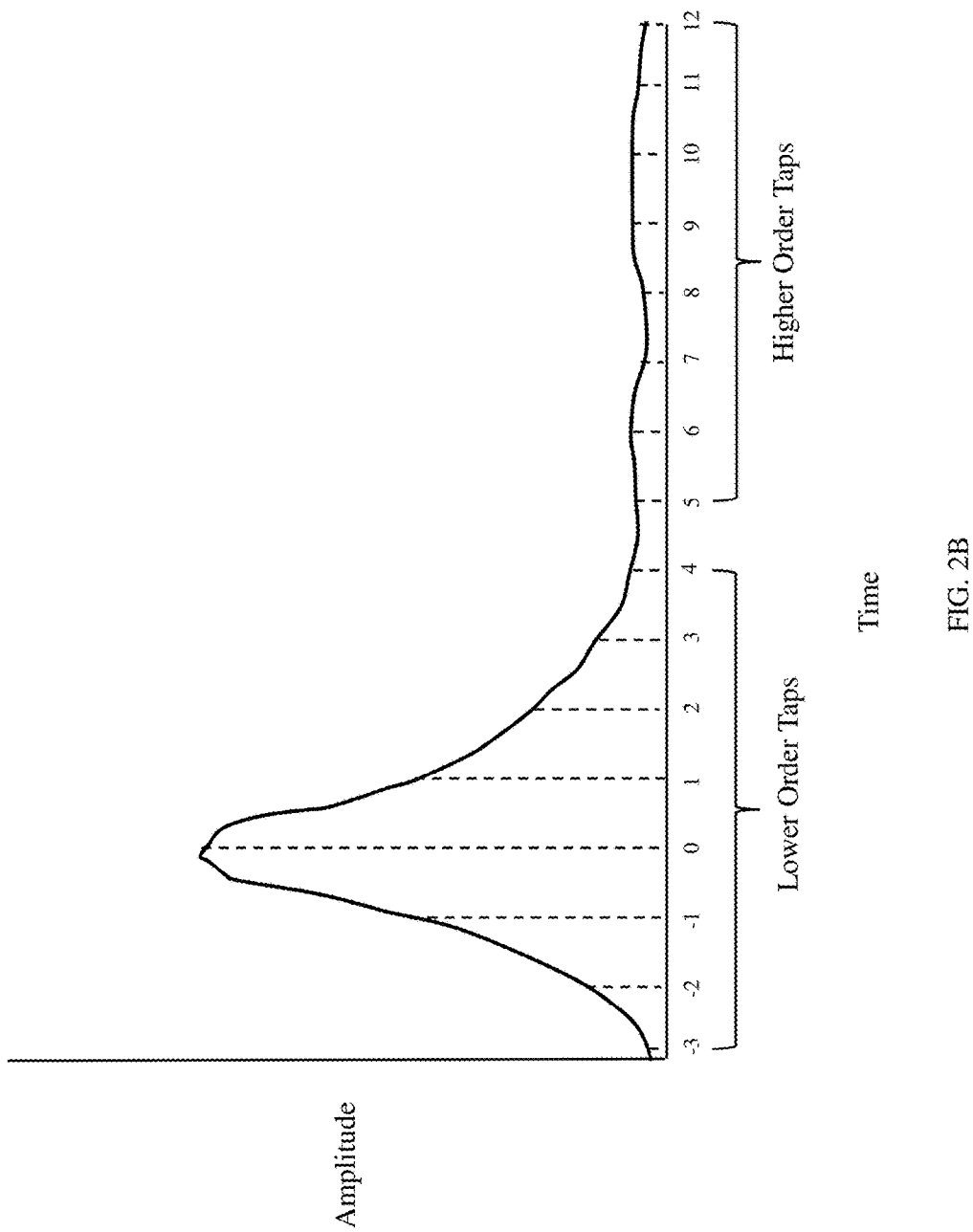
FIG. 2B illustrates an exemplary corrupted transmission pulse due to symbol interference.
Figure 2C:
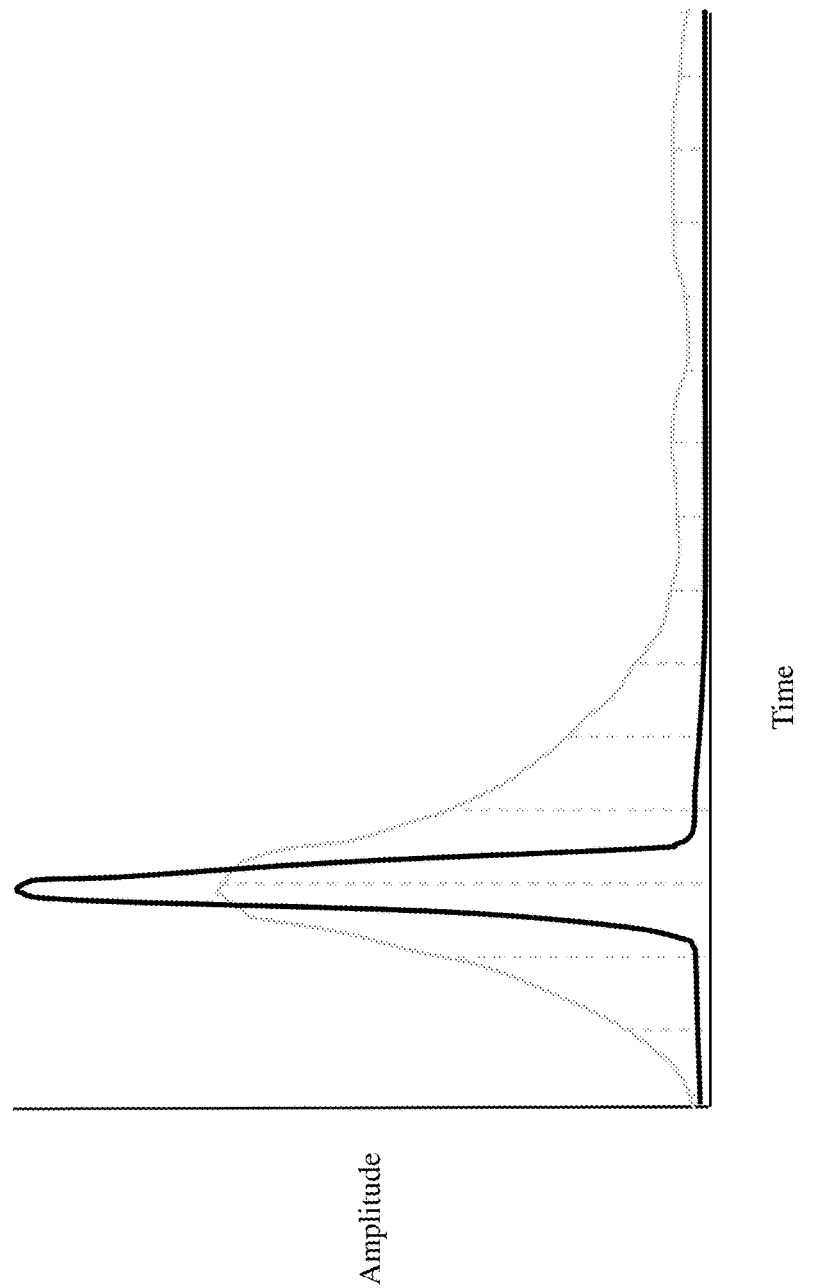
FIG. 2C illustrates an exemplary corrected transmission pulse.

As mentioned above, level-4 pulse amplitude modulation (PAM-4) signals are particularly susceptible to noise degradation during transmission. Consequently, within a PAM-4 receiver (RX), a received PAM-4 signal will initially be processed by an analog front end (AFE), which can include, but is not limited to, an amplifier and a continuous time linear equalizer (CTLE). Furthermore, the output of the AFE will be digitized through analog-to-digital conversion and then equalized using a feed forward equalizer (FFE), which corrects for signal loss by reducing the smear (as shown in FIG. 2C) and thereby reopening the "eye pattern" (as shown in FIG. 1D). Specifically, to correct for signal loss of a current data sample, which should represent a specific transmitted two-bit symbol and which is captured from a main cursor tap on a transmission medium, the FFE looks at data samples captured at other taps and, particularly, data samples captured before and after the current data sample (i.e., looks at data samples from pre-cursor and post-cursor taps on either side of a main cursor tap) and applies appropriate corrections that were determined earlier through a channel assessment algorithm while running standard training sequences. These corrections comprise channel coefficients determined by the channel assessment algorithm corresponding to each data sample before and after the current data sample. The coefficient weighted corrections on the pre- and post-cursor tap data samples when applied to the current data sample from the main cursor tap lead to the removal or reduction of the inter-symbol interference (i.e., the effect of smear from the neighboring two-bit symbols (in time)). Thus, the current data sample's digital value (i.e., the two-bit symbol indicated by the current data sample) corresponding to the analog level before FFE) is corrected to a new value that would ideally represent the correct digital value after compensation for the channel impulse response.

Figure 3:
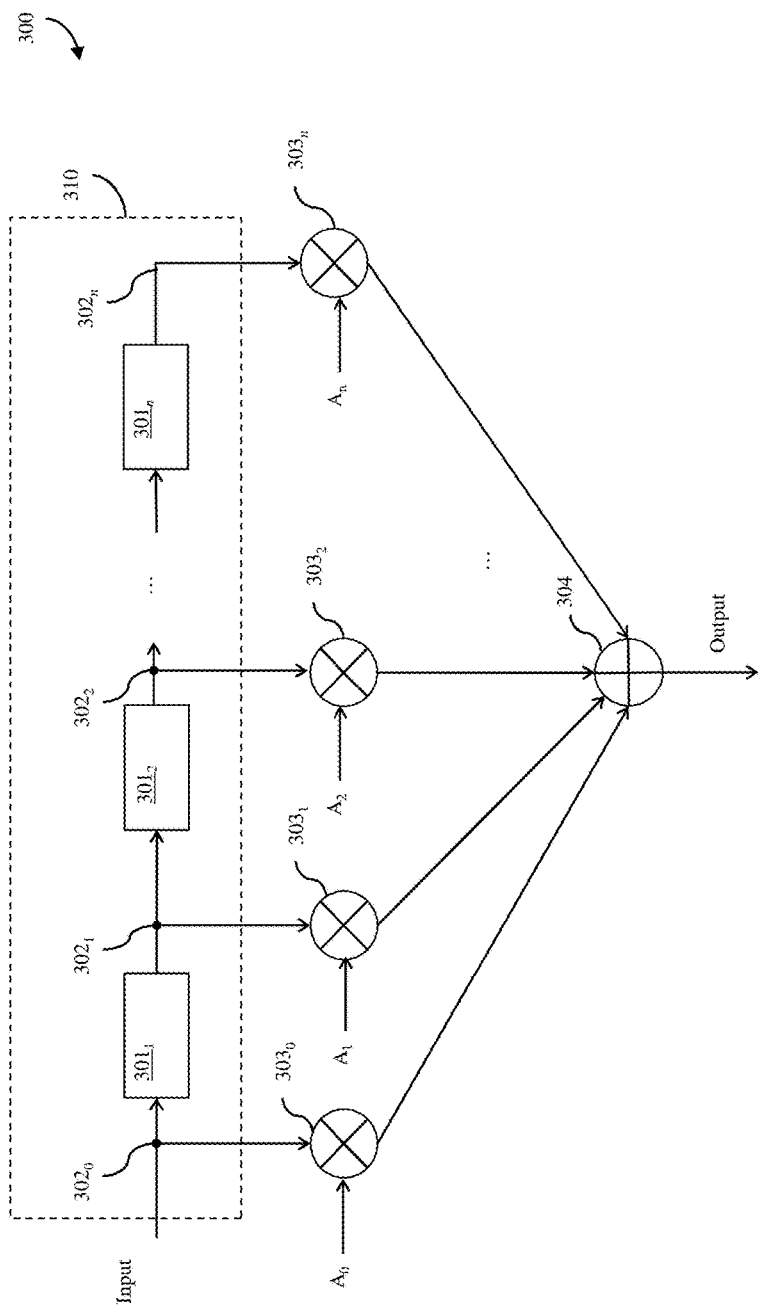
FIG. 3 is a schematic diagram illustrating an exemplary feed forward equalizer.

FIG. 3 illustrates an exemplary analog FFE 300, which employs a finite impulse response (FIR) filter. The FIR filter incorporates an n-stage delay line 310 that passes a received analog signal successively through delay elements $301_{1-n}$. Taps $302_{0-n}$, on the delay line 310 before and after each delay element $301_{1-n}$ feed into corresponding multipliers $303_{0-n}$. Each of the multipliers $303_{0-n}$ multiplies the received data by a corresponding tap weight $A_{0-n}$ (also known as a tap coefficient or filter coefficient) to obtain partial products. The taps weights are predetermined to compensate for the impulse response and, by duality, the frequency response. The products are then fed into downstream adder logic (including one or more adders 304) and the output of the FIR filter is a sum of the products. In other words, the output of the FIR filter (i.e., the FFE) is the result of a series of n+1 multiply and accumulate (MAC) operations.

Distributed arithmetic (DA) FFEs have recently been developed that can perform this same FIR filter function, but in a more time efficient manner by converting the signal levels at the taps from analog to digital and then processing them digitally. Specifically, in a RX that employs a DA FFE, the received analog signal is processed by the AFE and then digitized by analog-to-digital converters (ADCs). The ADCs output digital words at successive unit intervals (UIs) and these digital words represent the signal levels at the different taps. The MAC operations are not performed real time. Instead all possible outcomes of the MAC operations (i.e., pre-computed sums of partial products values) are stored in one or more distributed arithmetic (DA) look-up-tables and accessed using LUT addresses, which are generated using the digital words from the ADCs. The sum of partial products values acquired from the DA LUT(s) are added together by one or more adders to generate an output that is corrected for signal loss before undergo any further processing in the digital domain. While currently available FFE architectures are suitable for performing the required equalization process within receivers, improvements and/or modifications that enable device size scaling, power optimization and faster operating speeds are generally considered desirable.

In view of the foregoing, disclosed herein are embodiments of a power-optimized distributed arithmetic (DA)-based feed forward equalizer (FFE). The FFE embodiments are configured to perform DA-based feed forward equalization processing of a data sample from an incoming data stream only when necessary (i.e., on-demand) in order to save power. To accomplish this, the FFE can include a screener (i.e., a screening logic block). The screener can evaluate the data sample (which should represent a specific transmitted two-bit symbol) in real-time to determine whether or not equalization processing is necessary. Specifically, the data stream can be represented by multiple digital words, which indicate different signal levels at different taps on a transmission medium. The screener can apply a set of formulas to analyze selected ones of the digital words and, particularly, the digital words that represent the signal levels on at least the main cursor tap (which corresponds to the data sample at issue, also referred to as the current data sample), the first pre-cursor tap (which corresponds to the immediately preceding data sample) and the first post-cursor taps (which corresponds to the immediately following data sample) to determine whether or not the current data sample has degraded during transmission to a point where equalization processing is required. If so, the screener can set a bypass flag to a first level so that the current data sample is automatically subjected to DA-based feed forward equalization processing. If not, the screener can set the bypass flag to a second level so that equalization processing is bypassed. Significant power savings can be achieved by the disclosed DA architecture because the DA-based feed forward equalization processing is only performed on-demand. Also disclosed herein are embodiments of a corresponding power-optimized distributed arithmetic (DA)-based feed forward equalization method.

Figure 4:
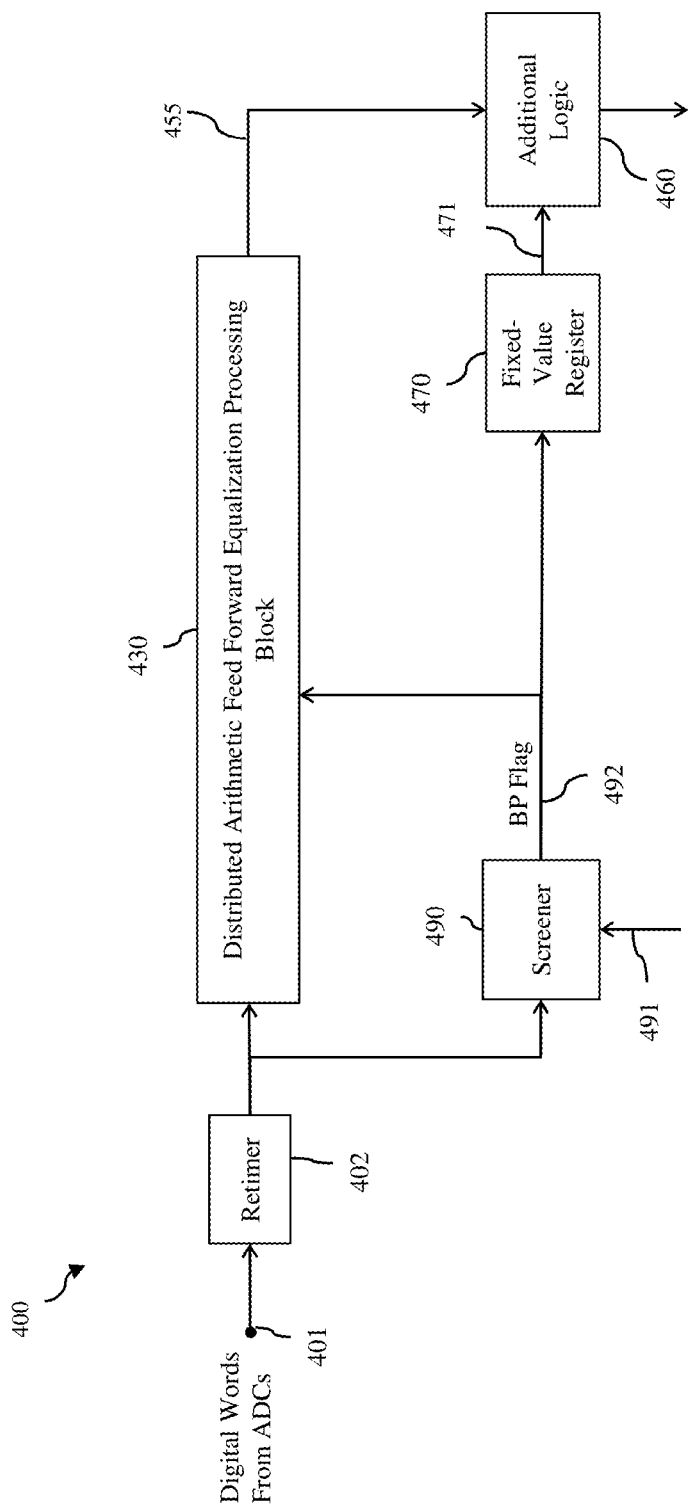
FIG. 4 is a schematic diagram illustrating embodiments of a power-optimized distributed arithmetic (DA)-based feed forward equalizer (FFE)

FIG. 4 illustrates, generally, the disclosed embodiments of a feed forward equalizer (FFE) 400 with a power-optimized distributed arithmetic (DA) architecture. The FFE 400 can be incorporated into a receiver (RX) and, particularly, a level-4 pulse amplitude modulation (PAM-4) data receiver, to correct for signal degradation of the data streams that make up the received PAM-4 signal. The RX can include an analog front end (AFE), which receives an analog signal transmitted from a transmitter (TX) and which can include, but is not limited to, an amplifier and a continuous time linear equalizer (CTLE) that initially processes the received PAM-4 signal. The RX can further include analog-to-digital converters (ADCs), which convert the signal levels sampled at different taps on the transmission medium from analog to digital, and output digital words in standard binary format to the FFE 400, which represent the data stream and indicate different signal levels at the different taps.

The FFE 400 can include, but is not limited to, a retimer 402, a distributed arithmetic (DA)-based feed forward equalization processing block 430, and additional logic 460 downstream of the processing block 430 to enable DA-based feed forward equalization processing of data samples from the data stream. In addition, the FFE 400 can include a screener 490, a fixed value register 470, and additional clocking functions (not shown) to enable bypassing of the DA-based feed forward equalization processing (if/when it is determined that a current data sample does not require correction).

The retimer 402 can have an input 401 that receives the digital inputs (e.g., the N-bit digital words) from the ADCs at successive unit intervals (UI). These digital words can represent an incoming data stream and can indicate different signal levels at different taps on a transmission medium. The retimer 402 can be configured to capture and hold received digital words until some predetermined number of the digital words are sampled (i.e., held). Once the predetermined number of digital words have been captured and held, the retimer 402 can forward them as a group to the processing block 430 for use, if necessary, during subsequent on-demand DA-based feed forward equalization processing (as discussed in greater detail below).

Those skilled in the art will recognize that each current data sample within a data stream (also referred to herein as the data sample at issue or main cursor data sample) represents a two-bit symbol and is captured at a main cursor tap on the transmission medium. Furthermore, the digital value of each current data sample can be affected to some degree (which is variable from sample-to-sample) by those data samples that precede or follow it within the data stream (referred to herein as pre-cursor and post-cursor data samples, respectively, and collectively as neighboring data samples) and that are captured at pre-cursor and post-cursor taps on the transmission medium. This affect (also referred to herein as symbol interference) will be indicated by the impulse response of the channel. To compensate for this symbol interference on a current data sample in a data stream, the DA-based FFE applies pre-calculated weighted corrections (e.g., for magnitude and polarity) to the pre-cursor and post-cursor data samples, thereby correcting the digital value of the current data sample so that it accurately reflects the transmitted two-bit symbol. The weights for each of the neighbor data samples are often referred to in the art as tap coefficients. The tap coefficients are represented digitally and stored in registers. The highest weights will be for the nearest neighboring data samples to the current data sample and the weights will decrease for data samples that are farther removed in time (per arrival sequence) from the current data sample.

In the disclosed FFE 400, the screener 490 (i.e., a screening logic block) can be configured to evaluate a current data sample from the data stream in real-time to determine whether or not that data sample (which should represent a specific transmitted two-bit symbol) has degraded, due to interference from neighboring data samples (i.e., preceding and following data samples within the data stream) during transmission to a point where equalization processing is required. Specifically, the screener 490 can capture and analyze and, particularly, apply a set of formulas to selected ones of the digital words forwarded to the processing block 430 and, based on the results, the screener 490 can set a bypass flag 492 to either a first level or a second level. The selected ones of the digital words can be, for example, the digital words representing the signal levels on at least the main cursor tap (which corresponds to the data sample at issue, also referred to herein as the current data sample in the data stream), a first pre-cursor tap (which corresponds to an immediately preceding data sample in the data stream) and a first post-cursor tap (which corresponds to an immediately following data sample in the data stream). As illustrated in FIG. 2B, the taps include a main cursor tap 0, which corresponds to the current data sample, multiple pre-cursor taps (e.g., −3 to −1) prior to the main cursor tap 0 and multiple post cursor taps (e.g., 1-12) following main cursor tap 0. The first pre-cursor tap −1 is the tap immediately before the main cursor tap 0 and the first post-cursor tap 1 is the tap immediately following the main cursor tap 0. Optionally, the selected ones of the digital words represent additional signal levels (e.g., signal levels on the second pre-cursor tap −2 and the second post-cursor tap 2).

The analysis process can specifically be performed by the screener 490 using the selected digital words, using defined dimensions for the ellipse shapes (i.e., for the pattern of eyes) in an optimal PAM-4 signal, including an error margin within each defined ellipse shapes, and further using additional inputs 491, such as the tap coefficients for taps associated with the selected digital words (e.g., the tap coefficients for the main cursor, first pre-cursor and first post-cursor taps), in order to solve the set of formulas (which are discussed in greater detail below). By solving the set of formulas (which consider the magnitudes and polarities of the signal levels on the taps associated with the selected digital words including at least the magnitudes and polarities of the signal levels on the main cursor tap, the first pre-cursor tap and the first post-cursor tap), the screener 490 can determine where the current data sample falls relative to the defined ellipse shapes of the optimal PAM-4 signal and thereby whether equalization processing is necessary.

Specifically, the magnitude and polarity of the current data sample is evaluated to determine if the current data sample would be subjected to a significantly large weighted correction during any subsequent equalization processing by the DA-based feed forward equalization processing block 430 and, if not, the magnitudes and polarities of the neighboring data samples (i.e., the first pre-cursor data sample and the first post-cursor data sample) are also evaluated to determine if the sum of their respective weighted corrections that would be required during any subsequent equalization processing by the DA-based feed forward equalization processing block 430 would be relatively small.

A large weighted correction for the current data sample is indicative of the current data sample being degraded to the point that it falls within one of the defined ellipse shapes of the optimal PAM-4 signal and, thereby requires equalization processing and, particularly, correction by the equalization processing block to ensure that it accurately represents the specific two-bit symbol transmitted within the data stream. A relatively small sum of the weighted corrections for the neighboring data samples is indicative of the current data sample being only slightly, if at all, degraded such that it falls outside the defined ellipse shapes of the optimal PAM-4 signal near the intended PAM-4 signal level (e.g., AN100, AN033, AP033 or AP100) and, thereby does not require equalization processing and, particularly, does not require correction by the equalization processing block to ensure that it accurately represents the specific two-bit symbol transmitted within the data stream.

Based on this determination, the screener 490 can set the bypass flag 492 to either the first level (e.g., "1" or "high") or the second level (e.g., "0" or "low"). Specifically, the screener 490 can set the bypass flag 492 to the first level when the results indicate that the current data sample falls inside (i.e., between the top and bottom or bottom and top) one of the defined ellipse shapes such that equalization processing (i.e., correction by the DA-based feed forward equalization processing block 430) is warranted and to the second level when the results indicate that the current data sample falls at or approximately at a desired signal level outside the defined ellipse shapes such that equalization processing (i.e., correction by the DA-based feed forward equalization processing block 430) is not warranted.

In any case, setting the bypass flag 492 at the first level can cause (i.e., can trigger) distributed arithmetic (DA)-based feed forward equalization processing of the current data sample to be performed by the processing block 430, whereas setting the bypass flag 492 at the second level can cause the DA-based feed forward equalization processing of the current data sample to be bypassed. Thus, only when the bypass flag 492 is set at the first level will access logic blocks for look-up table(s) and computer logic (e.g., adder(s)) operating within the processing block 430 output new data values (e.g., sum of partial product values and total sums thereof), thereby enabling the processing block 430 to output a new solution (i.e., a new output data value 455) for a DA equation, which corrects the current data sample so that it more accurately reflects the value of the specific transmitted two-bit symbol. When the DA-based feed forward equalization processing of the current data sample is bypassed (i.e., when the bypass flag 492 is set at the second level), the access logic blocks for the look-up table(s) and computer logic (e.g., adder(s)) operating within the processing block 430 will not output new data values and, thus, no new solution for the DA equation will be output by the processing block 430 (i.e., the output data value 455, which corresponds to the preceding data sample will be held constant). In this case (i.e., when the bypass flag is at the second level and no new solution is output), the fixed value register 470 can automatically select (e.g., via a multiplexor) and insert a fixed value digital word 471 into the additional logic 460 (e.g., into truncation logic), which is downstream of the DA architecture (i.e., downstream of processing block 430). The selected fixed value digital word 471 will be an acceptable solution value for the DA equation (which would otherwise have been solved by the processing block 430). Specifically, the selected fixed value digital word 471 can represent a selected one of the four PAM-4 signal levels corresponding to the transmitted two-bit symbol as indicated by the magnitude and polarity of the current data sample. That is, the fixed value digital word can represent the signal level at AN100 for the two-bit symbol 00, AN033 for the two-bit symbol 01, AP033 for the two-bit symbol 10 and AP100 for the two-bit symbol 11.

By setting the bypass flag to the second level, the FFE 400 avoids the power consuming DA-based feed forward equalization processing when such processing is deemed to be unnecessary. For example, the bypass flag can be fed into multiplexors within access logic blocks used for accessing sum of partial product values from look-up table(s) within the processing block 430 and, depending upon the flag level, can halt acquisition and summation of new sum of partial product values and, and thereby hold constant (i.e., freeze)

the output data value 455 from the processing block 430 that is fed into downstream logic. Alternatively, the bypass function can freeze data to the previous value of data in the compute logic by looping back the previous data as input to a mux with bypass flag as control input to the mux. In any case, as a result, all switching activity within the processing block 430 is avoided and switching power consumption is reduced.

It should be noted that holding the output data value 455 constant (i.e., freezing the output data value) when the bypass signal is at the second level can further be facilitated by halting the clock signal, which controls timing of the processing block 430. For example, the clock circuit can be configured with a clock transition skip function. Such clock circuits are well known in the art and, thus, the details have been omitted from this specification in order to allow the reader to focus on the salient aspects of the disclosed embodiments. In any case, with such a clock circuit, a clock signal can be fed into the processing block 430. When the bypass flag 492 is at the second level, the clock transition skip function can be triggered and, as a result, the clock signal can be frozen into registers that feed the processing block 430, thereby extending the current state of the clock and halting all clock-signal controlled processing (e.g., switching, etc.) within the processing block 430 and conserving power.

It should be noted that, as mentioned above and discussed in greater detail below, the determination as to whether or not DA equalization processing should be performed can be made using an error margin within the defined ellipse shapes. The size of this error margin can adjustable (i.e., tunable) to balance the need to reduce power consumption with conservatism (e.g., a threshold bit error rate and, particularly, a maximum acceptable bit error rate). Specifically, more risk is useful in reducing power when the channel is short because the degrading effects of the channel are less of a problem. Serial links designed today don't scale well on power metric when the signal integrity is good. The bypass/screening function can freeze data to the previous value of data in the compute logic by looping back the previous data as input to a mux with bypass flag as control input to the mux.

It should be understood that a DA FFE will typically include multiple DA FFE slices (configured as described above) that operate in parallel (e.g., to process different groups of digital inputs from substantially overlapping sub-sets of analog-to-digital converters (ADCs) within a larger set of ADCs). Additionally, in some embodiment the DA-based feed forward equalization processing block may include multiple processing sections to allow for parallel processing of relatively small groups of the digital words (e.g., from lower order taps and higher order taps) received by the retimer in that slice.

To better illustrate the features of the disclosed FFEs with power-optimized distributed arithmetic (DA) architecture, one particular embodiment (namely FFE 500) is described in greater detail below and illustrated in FIG. 5.

Figure 5:
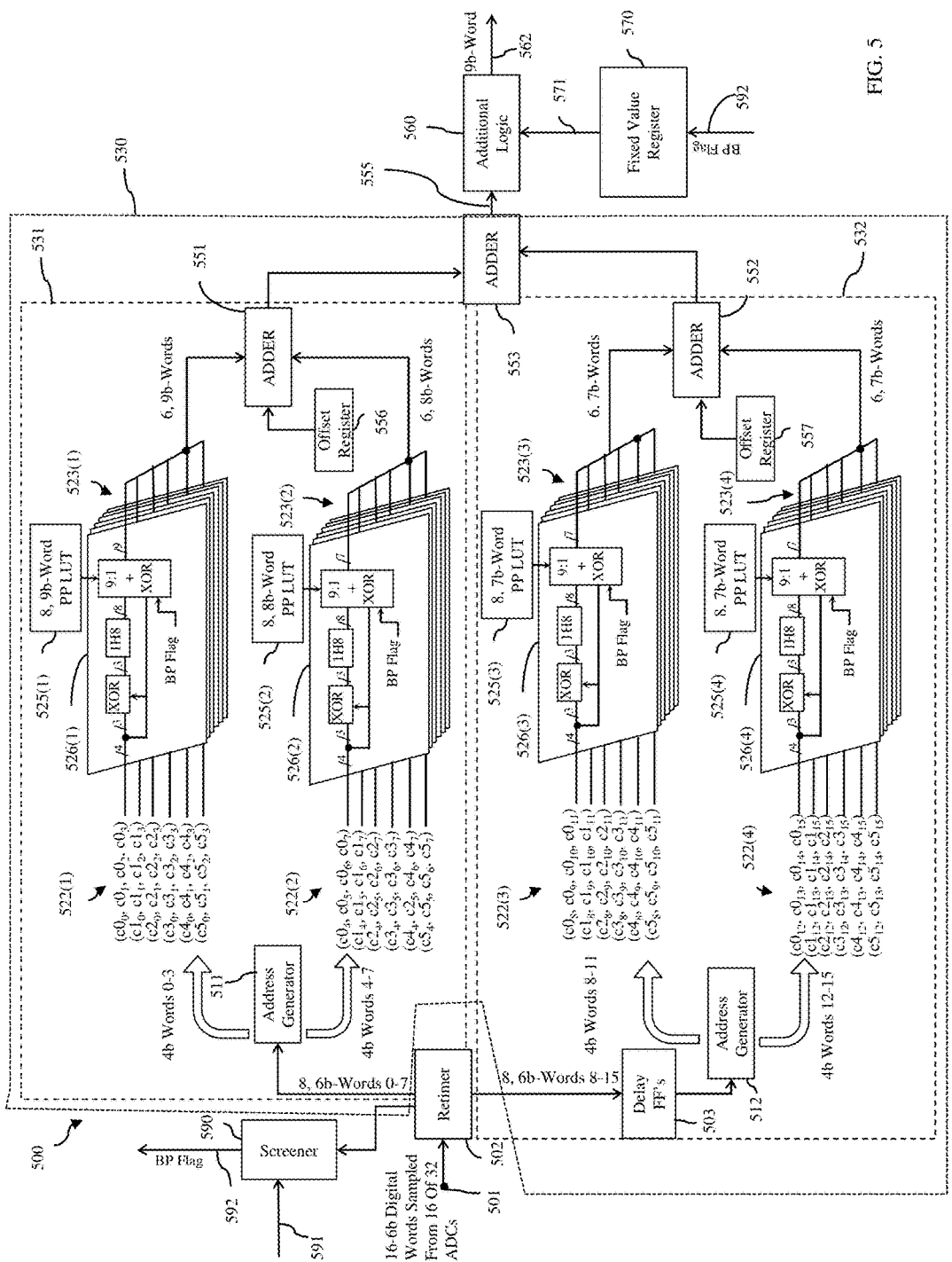
FIG. 5 is a schematic diagram illustrating a particular embodiment of a power-optimized distributed arithmetic (DA)-based feed forward equalizer (FFE)

The FFE 500 can include sixteen FFE slices (only one of which is shown in FIG. 5) that operate in parallel to process sixteen different groups of digital words (e.g., from sixteen substantially overlapping sub-sets of ADCs within a larger set of thirty-two ADCs 0-32). One FFE slice can receive and process digital words from ADCs 0-15, another can receive and process digital words from ADCs 1-16, another can receive and process digital words from ADCs 2-17, and so on.

Additionally, each FFE slice can include a retimer 502, a DA-based feed forward equalization processing block 530, a screener 590, additional logic 460 downstream from the processing block 530 and a fixed value register 570.

The processing block 530 can include a first processing section 531 that includes a first address generator 511, two DA look-up tables (LUTs) 525(1) and 525(2) in offset binary format, corresponding sets 526(1) and 526(2) of access logic blocks for the DA LUTs 525(1) and 525(2), a first offset register 556, and a first adder 551 for processing the digital words that represent a lower order portion of a data stream and indicate the analog signal levels sampled at the first eight taps (i.e., the lower order taps) on a transmission medium and converted to digital by the first eight ADCs. The processing block 530 can further include a second processing section 532 that includes a delay logic block 503, a second address generator 512, two DA look-up tables (LUTs) 525(3) and 525(4) in offset binary format, corresponding sets 526(3) and 526(3) of access logic blocks for the DA LUTs 525(3) and (4), a second offset register 557, and a second adder 552 for processing digital words that represent a higher order portion of a data stream and indicate the analog signal levels sampled at the next eight taps (i.e., the higher order taps) on the transmission medium and converted to digital by the next eight ADCs. The processing block 530 can further include a third adder 553 that computes the sum of the outputs of the first and second adders 551-552 to solve a DA equation.

More specifically, this processing block 530 can be configured to solve the following DA equation:

$$Y_k = \sum_{n=-3}^{12} A_n \times D_{k-n}, \quad (1)$$

where $Y_k$ are the digital outputs of the FFE corresponding to one group of digital word inputs, k is a unit time, n is the number of taps (e.g., 16), $D_k$ are the digital words received from the ADCs, and $A_n$ are the corresponding tap coefficients (also referred herein as tap weights or filter coefficients) for each of the sixteen taps −3 to 12. In this equation (1), $D_k$ can be represented as follows:

$$D_k = \left(-d_{k,5} \times 2^5 + \sum_{n=0}^{4} d_{k,n} \times 2^n\right) \text{ or} \quad (2)$$

$$D_k = \sum_{n=0}^{5} b_{k,n} \times 2^n, \quad (3)$$

where $b_{k,5} = -d_{k,5}$ for the MSB and $b_{k,n} = d_{k,n}$ for all other bits of the data sample $D_k$. Thus, equation (4) can be rewritten as follows:

$$Y_k = \sum_{n=-3}^{12} \left(\sum_{j=0}^{5} b_{(k-(n,j))} \times A^n\right) \times 2^j. \quad (4)$$

As mentioned above, the DA LUT's are in offset binary format. Those skilled in the art will recognize that in the standard binary format signal data is represented by a digital word containing bits of 0's and 1's with the most significant bit (MSB) in the digital word indicating signal polarity and the remaining bits (i.e., the least significant bit (LSB) to the next-to-MSB) indicating magnitude. For example, a 0 MSB can represent positive signal polarity and a 1 MSB can represent negative signal polarity. Offset binary format instead refers to a digital coding scheme where all-zero corresponds to the minimal negative value and all-one to the maximal positive value. For example, the 4-bit (4b) address of a LUT in standard binary format would range from 1000, the most negative value of −8 to 0111, the most positive value of +7 which is a range of 16 values. A first 4-bit address in standard binary format would be 0000 and in offset binary it would be offset upward by half the range, yielding 1000. 1000 is 0000+8, where 8 is half the full range of 16.

When using the offset binary format (as opposed to the standard binary format) the DA LUT size can be reduced. In this case, $D_k$ in the above equations can be rewritten as follows:

$$D_k = \frac{1}{2}\langle D_k - (-D_k)\rangle, \quad (5)$$

In two's complement, $-D_k$ can equate to the following:

$$-D_k = 1 + \sum_{n=0}^{5} \overline{b}_{k,n} \times 2^n. \quad (6)$$

Thus, the DA equation can further be rewritten as follows:

$$Y_k = \sum_{j=0}^{5}\left(\sum_{n=-3}^{12} \frac{1}{2} \times A_n \times c_{(k-(n,j))}\right) \times 2^j + \left(\sum_{n=-3}^{12} -\frac{1}{2} \times A_n\right) \quad (7)$$

where $$\sum_{j=0}^{5}\left(\sum_{n=-3}^{12} \frac{1}{2} \times A_n \times c_{(k-(n,j))}\right)$$

corresponds to a sum of products computation representative of a first half of the possible outcomes for the sum of partial products values (which are the sign-reversed mirror image of the bottom half, where $c_{k,n}$ represents $c_{k,n}=[b_{k,n}-\overline{b}_{k,n}]$, where, for n=0 to 5, $c_{k,n}$ takes $\{-1,1\}$ values because $b_{k,n}$ is $\{0,1\}$, and where $$\left(\sum_{n=-3}^{12} -\frac{1}{2} \times A_n\right)$$

represents a constant offset value (also referred to herein as $Q_{offset}$).

The retimer 502 can have an input 501, which receives the sixteen, 6-bit digital words from the sixteen ADCs at successive UIs. As mentioned above, the digital words can represent a data stream and can indicate different signal levels at different taps on a transmission medium. The retimer 502 can be configured to hold the digital words as they are received until the first eight 6b digital words from the first eight ADCs are received and then forward those first eight 6b digital words on to the first address generator 511 for use, if necessary, during subsequent on-demand equalization processing in the first processing section 531. The retimer 502 can further be configured to again hold the digital words as they are received until the next eight 6b digital words from the next eight ADCs are received and then forward the next eight 6b digital words on to the second address generator 512 for use, if necessary, during subsequent on-demand equalization processing in the second processing section 532.

As mentioned above, those skilled in the art will recognize that each current data sample within a data stream (also referred to herein as the data sample at issue or main cursor data sample) represents a two-bit symbol and is captured at a main cursor tap on the transmission medium. Furthermore, the digital value of each current data sample can be affected to some degree (which is variable from sample-to-sample) by those data samples that precede or follow it within the data stream (referred to herein as pre-cursor and post-cursor data samples, respectively, and collectively as neighboring data samples) and that are captured at pre-cursor and post-cursor taps on the transmission medium. This affect (also referred to herein as symbol interference) will be indicated by the impulse response of the channel. To compensate for this symbol interference on a current data sample in a data stream, the DA-based FFE applies pre-calculated weighted corrections (e.g., for magnitude and polarity) to the pre-cursor and post-cursor data samples, thereby correcting the digital value of the current data sample so that it accurately reflects the transmitted two-bit symbol. The weights for each of the neighbor data samples are often referred to in the art as tap coefficients. The tap coefficients are represented digitally and stored in registers. The highest weights will be for the nearest neighboring data samples to the current data sample and the weights will decrease for data samples that are farther removed in time (per arrival sequence) from the current data sample.

In the disclosed FFE 500, the screener 590 (i.e., a screening logic block) can be configured to evaluate a data sample (referred to herein as a current data sample or main cursor data sample) from the data stream in real-time to determine whether or not that current data sample (which should represent a specific transmitted two-bit symbol) has degraded during transmission to a point where equalization processing is required. Specifically, the screener 590 can capture and analyze and, particularly, apply a set of formulas to selected ones of the digital words that have been forwarded by the retimer 502 to the first address generator 511 of the first processing section 531 and, based on the results, the screener 590 can set a bypass flag 592 to either a first level or a second level. The selected ones of the digital words can be, for example, the digital words representing the signal levels on at least the main cursor tap (which corresponds to the data sample at issue, also referred to herein as the current data sample in the data stream), a first pre-cursor tap (which corresponds to an immediately preceding data sample in the data stream) and a first post-cursor tap (which corresponds to an immediately following data sample in the data stream). As illustrated in FIG. 2B, the taps include a main cursor tap 0, which corresponds to the current data sample, multiple pre-cursor taps (e.g., −3 to −1) prior to the main cursor tap 0 and multiple post cursor taps (e.g., 1-12) following main cursor tap 0. The first pre-cursor tap −1 is the tap immediately before the main cursor tap 0 and the first post-cursor tap 1 is the tap immediately following the main cursor tap 0. Optionally, the selected ones of the digital words represent additional signal levels (e.g., signal levels on the second pre-cursor tap −2 and the second post-cursor tap 2). In any case, these are all lower order taps and, thus, the corresponding digital words can be captured as they are output from the retimer 502 to the first address generator 511.

The analysis process can be performed by the screener 590 using the selected digital words, using defined dimensions for the ellipse shapes (i.e., for the pattern of eyes) in an optimal PAM-4 signal, including an error margin within each defined ellipse shapes, and using additional inputs 591, such as the tap coefficients for taps associated with the selected digital words (e.g., the tap coefficients for the main cursor, first pre-cursor and first post-cursor taps), in order to solve the set of formulas (which are discussed in greater detail below). By solving the set of formulas (which consider the magnitudes and polarities of the signal levels on the taps associated with the selected digital words including at least the magnitudes and polarities of the signal levels on the main cursor tap, the first pre-cursor tap and the first post-cursor tap), the screener 590 can determine where the current data sample falls relative to the defined ellipse shapes of the optimal PAM-4 signal and thereby whether equalization processing is necessary.

Specifically, the magnitude and polarity of the current data sample is evaluated to determine if the current data sample would be subjected to a significantly large weighted correction during any subsequent equalization processing by the DA-based feed forward equalization processing block 530 and, if not, the magnitudes and polarities of the neighboring data samples (i.e., the first pre-cursor data sample and the first post-cursor data sample) are also evaluated to determine if the sum of their respective weighted corrections that would be required during any subsequent equalization processing by the DA-based feed forward equalization processing block 430 would be relatively small.

A large weighted correction for the current data sample is indicative of the current data sample being degraded to the point that it falls within one of the defined ellipse shapes of the optimal PAM-4 signal and, thereby requires equalization processing and, particularly, correction by the equalization processing block to ensure that it accurately represents the specific two-bit symbol transmitted within the data stream. A relatively small sum of the weighted corrections for the neighboring data samples is indicative of the current data sample being only slightly, if at all, degraded such that it falls outside the defined ellipse shapes of the optimal PAM-4 signal near the intended PAM-4 signal level (e.g., AN100, AN033, AP033 or AP100) and, thereby does not require equalization processing and, particularly, does not require correction by the equalization processing block to ensure that it accurately represents the specific two-bit symbol transmitted within the data stream.

Based on this determination, the screener 590 can set the bypass flag 592 to either the first level (e.g., "1" or "high") or the second level (e.g., "0" or "low"). Specifically, the screener 590 can set the bypass flag 592 to the first level when the results indicate that the current data sample falls inside (i.e., between the top and bottom or bottom and top) one of the defined ellipse shapes such that equalization processing (i.e., correction by the DA-based feed forward equalization processing block 430) is warranted and to the second level when the results indicate that the current data sample falls at or approximately at a desired signal level outside the defined ellipse shapes such that equalization processing (i.e., correction by the DA-based feed forward equalization processing block 530) is not warranted.

In any case, setting the bypass flag 592 at the first level can cause (i.e., can trigger) parallel distributed arithmetic (DA)-based feed forward equalization processing of the current data sample from the main cursor tap to be performed in both the first processing section 531 and the second processing section 532. Setting the bypass flag 592 at the second level can cause the DA-based feed forward equalization processing of the current data sample within the processing block 530 to be bypassed.

Specifically, as mentioned above, the first processing section 531 (i.e., the lower order tap processing section) can include a first DA LUT 525(1) and a second DA LUT 525(2) in offset binary format and the corresponding sets 526(1) and 526(s) of six access logic blocks for the DA LUTs 525(1) and 525(2), respectively. The first DA LUT 525(1) can store pre-calculated first possible outcomes for first sum of partial products computations associated with the four lowest taps (i.e., taps −3 to 0). The second DA LUT 525(2) can store pre-calculated second possible outcomes for second sum of partial products computations associated with the next four lowest taps (i.e., taps 1 to 4).

The first address generator 511 can generate DA LUT addresses for acquiring data from the first DA LUT 525(1) and the second DA LUT 525(2) using the first eight of sixteen digital words received by the FFE slice and forwarded to the first address generator 511 of the first processing section 531 from the retimer 502. Specifically, the first address generator 511 can first divide the received digital words into two groups of four 6b digital words (i.e., a first group and a second group). The first address generator 511 can then generate six first DA LUT addresses, in standard binary format, by decomposing the four 6b digital words in the first group and using the corresponding bits from those words to form six, standard binary, first DA LUT addresses, each having 4 bits. That is, the first address generator 511 can generate the six, standard binary, 4b first DA LUT addresses from a group of least significant bits (LSBs) of the first group through a group of most significant bits (MSBs) of the first group, respectively. The first address generator 511 can further convert (or map) these six, standard binary, 4b first DA LUT addresses to six, offset binary, 4b first DA LUT addresses 522(1), respectively, and forward them to the access logic blocks in the set 526(1). The first address generator 511 can also generate six second DA LUT addresses, in standard binary format, by decomposing the four 6b digital words in the second group and using the corresponding bits from those words to form six, standard binary, second DA LUT addresses, each having 4 bits. That is, first address generator 511 can generate the six, standard binary, 4b second DA LUT addresses from a group of LSBs of the second group through a group of MSBs of the second group, respectively. The first address generator 511 can further convert (or map) these six, standard binary, 4b second DA LUT addresses to six, offset binary, 4b second DA LUT addresses 522(2), respectively, and forward them to the access logic blocks in the set 526(2).

Similarly, the second processing section 532 (i.e., the higher order tap processing section) can include a third DA LUT 525(3) and a fourth DA LUT 525(4) in offset binary format and the corresponding sets 526(3) and 526(4) of six access logic blocks for these DA LUTs 525(1) and 525(2), respectively. The third DA LUT 525(3) can store pre-calculated third possible outcomes for third sum of partial products computations associated with the next four taps (i.e., taps 5 to 8). The fourth DA LUT 525(4) can store pre-calculated fourth possible outcomes for fourth sum of partial products computations associated with the highest four taps (i.e., taps 9 to 12).

Those skilled in the art will recognize that the tap coefficients $A_n$ used in the modified DA equation computations (i.e., the sum of partial products computations and the correction plus offset computations) for the lower order taps (i.e., taps −3 to 7) will be greater than those used in the same computations for the higher order taps. Thus, the sum of partial products values stored by the DA LUTs 525(1) and 525(2) in the first processing section will be larger than those stored by the DA LUTs 525(3) and 525(4) in the second processing section 532. For example, in the exemplary embodiment shown in FIG. 5, the first DA LUT 525(1) can store eight 9b words for the first sum of partial products values; the second DA LUT 525(2) can store eight 8b words for the second sum of partial products values; the third DA LUT 525(3) can store eight 7b words for the third sum of partial products values; and the fourth DA LUT 525(4) can store eight 7b words for fourth sum of partial products values.

The second address generator 512 can receive and generate DA LUT addresses for the next eight of sixteen digital words received by the FFE slice and forwarded to the second address generator 512 of the second processing section 532 from the retimer 502 (via the delay logic block 503). Specifically, the second address generator 512 can first divide the received digital words into two groups of four 6b digital words (i.e., into a third group and a fourth group). The second address generator 512 can then generate six third DA LUT addresses, in standard binary format, by decomposing four 6b digital words in the third group and using the corresponding bits from those words to form six, standard binary, third DA LUT addresses, each having 4 bits. That is, the second address generator 512 can generate the six, standard binary, 4b third DA LUT addresses from a group of LSBs of the third group through a group of MSBs of the third group, respectively. The second address generator 512 can further convert (or map) these six, standard binary, 4b third DA LUT addresses to six, offset binary, 4b third DA LUT addresses 522(3), respectively, and forward them to the access logic blocks in the set 526(3). The second address generator 512 can also generate six fourth DA LUT addresses, in standard binary format, by decomposing the four 6b digital words in the fourth group and using the corresponding bits from those words to form six, standard binary, fourth DA LUT addresses, each having 4 bits. That is, second address generator 512 can generate the six, standard binary, 4b fourth DA LUT addresses from a group of LSBs of the fourth group through a group of MSBs of the fourth group, respectively. The second address generator 512 can further convert (or map) these six, standard binary, 4b fourth DA LUT addresses to six, offset binary, 4b fourth DA LUT addresses 522(4), respectively, and forward them to the access logic blocks in the set 526(4).

Thus, each access logic block in a given set can receive both a DA LUT address from an address generator and the bypass flag 592 as inputs. Only when the bypass flag 592 is set at the first level, however, will the access logic block acquire and output a sum of partial products value stored at the addressed location within its corresponding DA LUT. That is, when the bypass flag is at the first level, the first access logic blocks 526(1) will acquire first sum of partial products values 523(1) from the addressed locations within the first DA LUT 525(1) and output those values to the first adder 551. The second access logic blocks 526(2) will acquire second sum of partial products values 523(2) from the addressed locations within the second DA LUT 525(2) and output those values to the first adder 551. The third access logic blocks 526(3) will acquire third sum of partial products values 523(3) from the addressed locations within the third DA LUT 525(3) and output those values to the second adder 552. The fourth access logic blocks 526(4) will acquire fourth sum of partial products values 523(4) from the addressed locations within the fourth DA LUT 525(3) and output those values to the second adder 552.

The first adder 551 (e.g., a first carry-save addition (CSA) tree circuit) or series of first adders can be configured to compute the total sum of the first sum of partial products values 523(1), the second sum of partial products values 523(2) and, given that the DA LUTs are in offset binary format, a first offset value (i.e., a first $Q_{offset}$) from the first offset register 556. The second adder 552 (e.g., a second carry-save addition (CSA) tree circuit) can be configured to compute the total sum of the third sum of partial products values 523(3), the fourth sum of partial products values 523(4) and, again given the DA LUTs are in offset binary format, a second offset value (i.e., a second $Q_{offset}$) from the second offset register 557.

The third adder 553 (e.g., a Kogge-Stone adder (KSA), also referred to as a carry look-ahead adder) can be configured to add together addends from the first adder 551 and the second adder 552.

It should be noted that pipeline flop registers (not shown) can be inserted between the hierarchical adders 551-553 in order to maintain proper timing and, particularly, in order to maintain the C8 clock whose frequency is one eighth the incoming bit rate, C1 throughout the FFE 500. Additionally, as mentioned above, the FFE 500 can further include additional logic 560 downstream of processing block 530 and, particularly, downstream of the third adder 551. This additional logic 560 can include, but is not limited, truncation logic employed to truncate the output of the third adder 553 such that the final output 562 of the FFE 500 is a digital word with a preset length (e.g., a 9-bit digital word).

In any case, setting the bypass flag 592 at the first level can cause (i.e., can trigger) distributed arithmetic (DA)-based feed forward equalization processing of the current data sample to be performed by the processing block 530, whereas setting the bypass flag 592 at the second level can cause the DA-based feed forward equalization processing of the current data sample to be bypassed. Thus, only when the bypass flag 592 is set at the first level will the access logic blocks 526(1)-526(4) and computer logic (e.g., adders 551-553) output new data values (e.g., new sum of partial product values and total sums thereof), thereby enabling the processing block 530 to output a new solution (i.e., new output data value 555) for a DA equation, which corrects the current data sample so that it more accurately reflects the value of the specific transmitted two-bit symbol. When the DA-based feed forward equalization processing of the current data sample is bypassed (i.e., when the bypass flag 592 is set at the second level), the access logic blocks 526(1)-526(4) and computer logic (e.g., adders 551-553) will not output new data and, thus, no new solution for the DA equation will be output by the processing block 530 (i.e., the output data value 555, which corresponds to the preceding data sample, will be held constant). In this case, when the bypass flag is at the second level and no new solution is output, the fixed value register 570 can automatically select (e.g., via a multiplexor) and insert a fixed value digital word 571 into the additional logic 560 (e.g., into truncation logic), which is downstream of the DA architecture (i.e., downstream of processing block 530). The selected fixed value digital word 571 will be an acceptable solution value for the DA equation (which would otherwise have been solved by the processing block 530). Specifically, the selected fixed value digital word 571 can represent a selected one of the four PAM-4 signal levels corresponding to the transmitted two-bit symbol as indicated by the magnitude and polarity of the current data sample. That is, the fixed value digital word can represent the signal level at AN100 for the two-bit symbol 00, AN033 for the two-bit symbol 01, AP033 for the two-bit symbol 10 and AP100 for the two-bit symbol 11.

By setting the bypass flag 592 to the second level, the FFE 500 avoids the power consuming DA feed forward equalization processing when such processing is deemed to be unnecessary. For example, the bypass flag 592 can be fed into multiplexors within the access logic blocks 526(1)-526 (4), which are used for accessing sum of partial product values from the LUTs 525(1)-525(4), respectively, within the processing sections 531-532 of the processing block 530 to halt acquisition of new sum of partial product values from the LUT(s) and summation of those values by computer logic (i.e., adders 551-553) and, thereby hold constant (i.e., freeze) the output data value 555 from the processing block 530 (and, particularly, from the third adder 553). Alternatively, the bypass function can freeze data to the previous value of data in the compute logic by looping back the previous data as input to a mux with bypass flag as control input to the mux. In any case, as a result, all switching activity is avoided and switching power consumption is reduced. In any case, as a result, all switching activity within the processing block 530 is avoided and switching power consumption is reduced.

It should be noted that holding the output data value 555 constant (i.e., freezing the output data value) when the bypass flag 592 is at the second level can further be facilitated by halting the clock signal, which controls timing of the processing block 530. For example, the clock circuit can be configured with a clock transition skip function. Such clock circuits are well known in the art and, thus, the details have been omitted from this specification in order to allow the reader to focus on the salient aspects of the disclosed embodiments. In any case, with such a clock circuit, a clock signal can be fed into the processing block 530. When the bypass flag 592 is at the second level, the clock transition skip function can be triggered and, as a result, the clock signal can be frozen into registers that feed the processing block 530, thereby extending the current state of the clock and halting all clock-signal controlled processing (e.g., switching, etc.) within the processing block 530.

It should be understood that the configuration for the DA-based feed forward equalization processing block 530 of FIG. 5 is not intended to be limiting. Alternatively, this processing block 530 can have any other suitable DA architecture configured to allow a bypass flag to be inserted into the access logic blocks of each DA LUT in order to trigger or bypass DA-based feed forward equalization processing depending upon the flag level.

Figure 6:
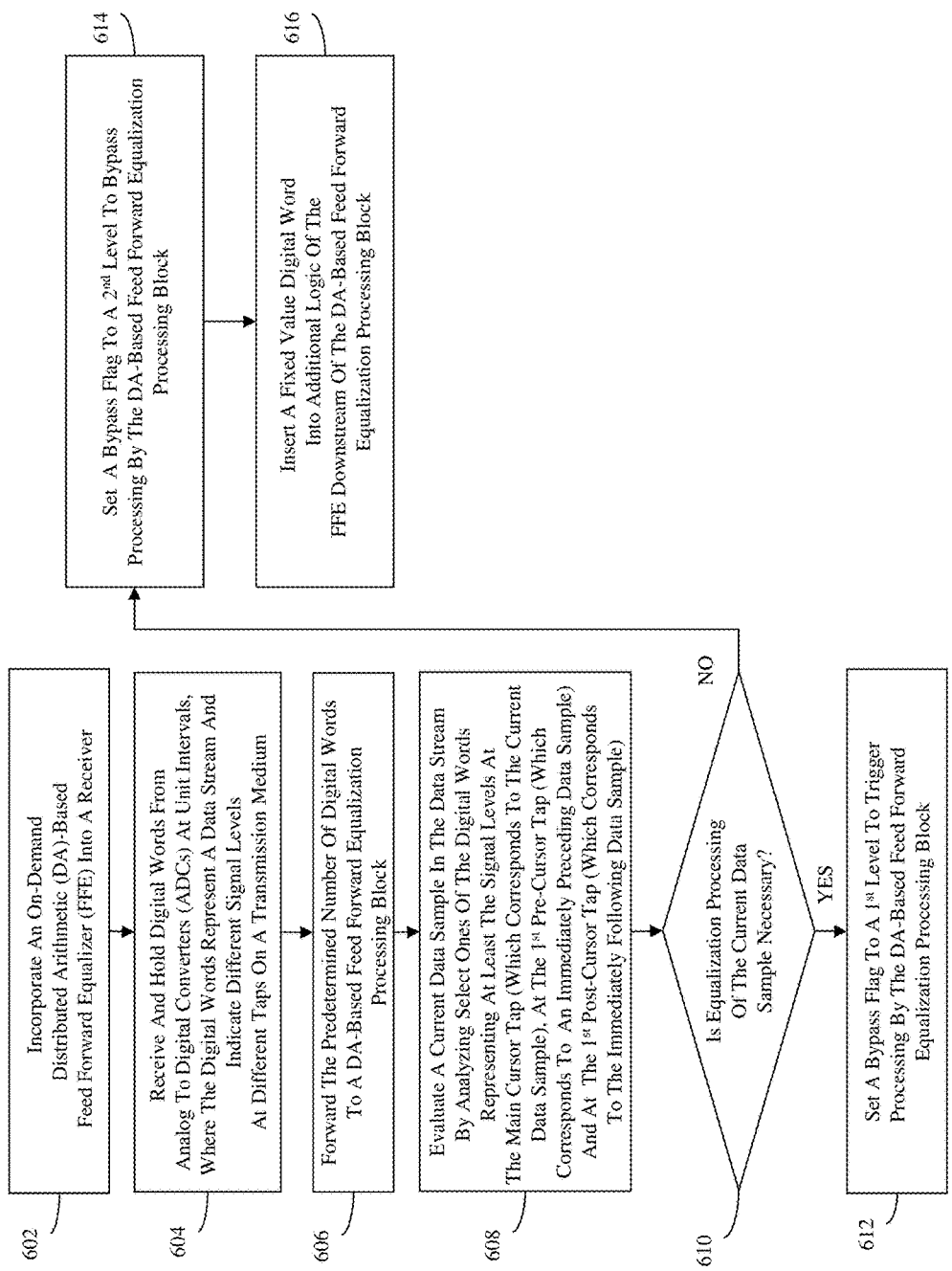
FIG. 6 is a schematic diagram illustrating a power-optimized distributed arithmetic (DA)-based feed forward equalization method.

Referring to the flow diagram of FIG. 6, also disclosed herein are on-demand distributed arithmetic (DA)-based feed forward equalization methods that can be performed by above-described FFE. Specifically, the method can include incorporating an on-demand DA-based FFE (e.g., such as the FFE 400 shown in FIG. 4 or the FFE 500 shown in FIG. 5) into a receiver (RX) and, particularly, into a level-4 pulse amplitude modulation (PAM-4) data receiver, to correct for signal degradation of the data streams that make up the received PAM-4 signal (see process step 602). As discussed above, the RX can include an analog front end (AFE), which receives an analog signal transmitted from a transmitter (TX) and which can include, but is not limited to, an amplifier and a continuous time linear equalizer (CTLE) that initially processes the received PAM-4 signal. The RX can further include analog-to-digital converters (ADCs), which convert the signal levels sampled at different taps on the transmission medium from analog to digital, and output digital words in standard binary format to the FFE 400, which represent the data stream and indicate different signal levels at the different taps.

The method can further include receiving, at an input 401, 501 to a retimer 402, 502 of the FFE 400, 500, digital inputs (e.g., the N-bit digital words) from the ADCs at successive unit intervals (UI) (see process step 604). The digital words can represent an incoming data stream and can indicate different signal levels at different taps on a transmission medium. The received digital words can be captured and held by the receiver until some predetermined number of the digital words are sampled (i.e., held). The method can further include, once the predetermined number of digital words have been captured and held, forwarding them as a group to a DA-based equalization processing block 430, 530 of the FFE 400, 500 for use, if necessary, during subsequent on-demand DA-based feed forward equalization processing (as discussed in greater detail below) (see process step 606).

Those skilled in the art will recognize that each current data sample within a data stream (also referred to herein as the data sample at issue or main cursor data sample) represents a two-bit symbol and is captured at a main cursor tap on the transmission medium. Furthermore, the digital value of each current data sample can be affected to some degree (which is variable from sample-to-sample) by those data samples that precede or follow it within the data stream (referred to herein as pre-cursor and post-cursor data samples, respectively, and collectively as neighboring data samples) and that are captured at pre-cursor and post-cursor taps on the transmission medium. This affect (also referred to herein as symbol interference) will be indicated by the impulse response of the channel. To compensate for this symbol interference on a current data sample in a data stream, the DA-based FFE applies pre-calculated weighted corrections (e.g., for magnitude and polarity) to the pre-cursor and post-cursor data samples, thereby correcting the digital value of the current data sample so that it accurately reflects the transmitted two-bit symbol. The weights for each of the neighbor data samples are often referred to in the art as tap coefficients. The tap coefficients are represented digitally and stored in registers. The highest weights will be for the nearest neighboring data samples to the current data sample and the weights will decrease for data samples that are farther removed in time (per arrival sequence) from the current data sample.

The disclosed method can include evaluating, by a screener 490, 590 (i.e., a screening logic block) of the FFE 400, 500, current data sample from the data stream in real-time to determine whether or not that data sample (which should represent a specific two-bit symbol) has degraded, due to interference from neighboring data samples (i.e., preceding and following data samples within the data stream) during transmission to a point where equalization processing is required (see process steps 608-610). Specifically, the method can include using the screener 490, 590 to capture and analyze and, particularly, to apply a set of formulas to selected ones of the digital words forwarded to the processing block 430, 530 (see process steps 608-610) and to set a bypass flag 492 to either a first level or a second level, based on the results (see process steps 612 and 614).

The selected ones of the digital words can be, for example, the digital words representing the signal levels on at least the main cursor tap (which corresponds to the data sample at issue, also referred to herein as the current data sample in the data stream), a first pre-cursor tap (which corresponds to an immediately preceding data sample in the data stream) and a first post-cursor tap (which corresponds to an immediately following data sample in the data stream). As illustrated in FIG. 2B, the taps include a main cursor tap 0, which corresponds to the current data sample, multiple pre-cursor taps (e.g., −3 to −1) prior to the main cursor tap 0 and multiple post cursor taps (e.g., 1-12) following main cursor tap 0. The first pre-cursor tap −1 is the tap immediately before the main cursor tap 0 and the first post-cursor tap 1 is the tap immediately following the main cursor tap 0. Optionally, the selected ones of the digital words represent additional signal levels (e.g., signal levels on the second pre-cursor tap −2 and the second post-cursor tap 2).

At process step 608, the analysis can be performed by the screener 490, 590 using the selected digital words, using defined dimensions for the ellipse shapes (i.e., for the pattern of eyes) in an optimal PAM-4 signal, including an error margin within each defined ellipse shapes, and further using additional inputs 491, 591, such as the tap coefficients for taps associated with the selected digital words (e.g., the tap coefficients for the main cursor, first pre-cursor and first post-cursor taps), in order to solve the set of formulas (which are discussed in greater detail below). By solving the set of formulas (which consider the magnitudes and polarities of the signal levels on the taps associated with the selected digital words including at least the magnitudes and polarities of the signal levels on the main cursor tap, the first pre-cursor tap and the first post-cursor tap) at process step 608, a determination is made as to where the current data sample falls relative to the defined ellipse shapes of the optimal PAM-4 signal and thereby whether equalization processing is necessary.

Specifically, the magnitude and polarity of the current data sample is evaluated at process step 608 to determine if the current data sample would be subjected to a significantly large weighted correction during any subsequent equalization processing and, if not, the magnitudes and polarities of the neighboring data samples (i.e., the first pre-cursor data sample and the first post-cursor data sample) are also evaluated to determine if the sum of their respective weighted corrections that would be required during any subsequent equalization processing would be relatively small.

A large weighted correction for the current data sample is indicative of the current data sample being degraded to the point that it falls within one of the defined ellipse shapes of the optimal PAM-4 signal and, thereby requires equalization processing and, particularly, correction to ensure that it accurately represents the specific two-bit symbol transmitted within the data stream (see process step 610). A relatively small sum of the weighted corrections for the neighboring data samples is indicative of the current data sample being only slightly, if at all, degraded such that it falls outside the defined ellipse shapes of the optimal PAM-4 signal near the intended PAM-4 signal level (e.g., AN100, AN033, AP033 or AP100) and, thereby does not require equalization processing and, particularly, does not require correction to ensure that it accurately represents the specific two-bit symbol transmitted within the data stream (see process step 610).

The method can further include, based on the determination regarding the need for equalization processing made at process step 610, a bypass flag 492, 592 can be set to either the first level (e.g., "1" or "high") (see process step 612) or the second level (e.g., "0" or "low") (see process step 614) by the screener 490, 590. Specifically, the bypass flag 492, 592 can be set to the first level at process step 612 when the results indicate that the current data sample falls inside (i.e., between the top and bottom or bottom and top) one of the defined ellipse shapes in the PAM-4 eye pattern such that equalization processing (i.e., correction by the DA-based feed forward equalization processing block 430, 530) is warranted and to the second level at process step 614 when the results indicate that the current data sample falls at or approximately at a desired signal level outside the defined ellipse shapes such that equalization processing (i.e., correction by the DA-based feed forward equalization processing block 430, 530) is not warranted.

Setting the bypass flag 492, 592 at the first level at process step 612 can cause (i.e., can trigger) distributed arithmetic (DA)-based feed forward equalization processing of the current data sample to be performed by the processing block 430, 530, whereas setting the bypass flag 492, 592 at the second level at process step 614 can cause the DA-based feed forward equalization processing of the current data sample to be bypassed. Thus, only when the bypass flag 492, 592 is set at the first level at process step 612 will access logic blocks for look-up table(s) and computer logic (e.g., adder(s)) operating within the processing block 430, 530 output new data values (e.g., sum of partial product values and total sums thereof), thereby enabling the processing block 430, 530 to output a new solution (i.e., a new output data value 455, 555) for a DA equation, which corrects the current data sample so that it more accurately reflects the value of the specific transmitted two-bit symbol. When the DA-based feed forward equalization processing of the current data sample is bypassed (i.e., when the bypass flag 492 is set at the second level) at process step 614, the access logic blocks for the look-up table(s) and computer logic (e.g., adder(s)) operating within the processing block 430, 530 will not output new data values and, thus, no new solution for the DA equation will be output by the processing block 430, 530 (i.e., the output data value 455, 555, which corresponds to the preceding data sample will be held constant). In this case (i.e., when the bypass flag is at the second level and no new solution is output), the method can further include automatically selecting (e.g., via a multiplexor) a fixed value digital word 471, 571 and inserting that fixed value digital word 471, 571 into additional logic 460, 560 (e.g., into truncation logic), which is downstream of the DA architecture (i.e., downstream of processing block 430) (see process step 616). The selected fixed value digital word 471, 571 will be an acceptable solution value for the DA equation (which would otherwise have been solved by the processing block 430, 530). Specifically, the selected fixed value digital word 471, 571 can represent a selected one of the four PAM-4 signal levels corresponding to the transmitted two-bit symbol as indicated by the magnitude and polarity of the current data sample. That is, the fixed value digital word can represent the signal level at AN100 for the two-bit symbol 00, AN033 for the two-bit symbol 01, AP033 for the two-bit symbol 10 and AP100 for the two-bit symbol 11.

By setting the bypass flag 492, 592 to the second level when equalization processing is not deemed necessary at process step 610, the disclosed method conserves power by halting all switching activity within the processing block 430, 530 and, thereby holding the output data value 455, 555 constant (i.e., freezing the output data value). This process can further be facilitated by also halting the clock signal, which controls timing of the processing block 430, 530. For example, the method can further include triggering a clock transition skip function of a clock circuit when the bypass flag 492, 592 is at the second level in order to extend the current state of the clock and, thereby halt all clock-signal controlled processing (e.g., switching, etc.) to conserving power.

It should be noted that, as mentioned above and discussed in greater detail below, the determination as to whether or not DA equalization processing should be performed at process step 610 can be made using an error margin within the defined ellipse shapes. The size of this error margin can adjustable (i.e., tunable) to balance the need to reduce power consumption with conservatism (e.g., a threshold bit error rate and, particularly, a maximum acceptable bit error rate). Specifically, more risk is useful in reducing power when the channel is short because the degrading effects of the channel are less of a problem. Serial links designed today don't scale well on power metric when the signal integrity is good. The bypass/screening function can freeze data to the previous value of data in the compute logic by looping back the previous data as input to a mux with bypass flag as control input to the mux.

The analysis process employed by the above-mentioned screener (i.e., the screener 490 of FIG. 4 or 590 of FIG. 5) at process steps 608-610 to evaluate degradation of a current data sample of a data stream due to interference from neighboring data samples in the data stream are described in greater detail below.

FIG. 7A is an exemplary eye diagram of a level-4 pulse amplitude modulation (PAM-4) showing the three, stacked, defined ellipse shapes 701a-701c (i.e., eye pattern) between four distinct PAM-4 signal levels including: AN100 for the two-bit symbol 00, AN033 for the two-bit symbol 01, AP033 for the two-bit symbol 10 and AP100 for the two-bit symbol 11.

As mentioned above, those skilled in the art will recognize that each current data sample within a data stream (also referred to herein as the data sample at issue or main cursor data sample) represents a two-bit symbol and is captured at a main cursor tap on the transmission medium. Furthermore, the digital value of each current data sample can be affected to some degree (which is variable from sample-to-sample) by those data samples that precede or follow it within the data stream (referred to herein as pre-cursor and post-cursor data samples, respectively, and collectively as neighboring data samples) and that are captured at pre-cursor and post-cursor taps on the transmission medium. This affect (also referred to herein as symbol interference) will be indicated by the impulse response of the channel. To compensate for this symbol interference on a current data sample in a data stream, the DA-based FFE applies pre-calculated weighted corrections (e.g., for magnitude and polarity) to the pre-cursor and post-cursor data samples, thereby correcting the digital value of the current data sample so that it accurately reflects the transmitted two-bit symbol. The weights for each of the neighbor data samples are often referred to in the art as tap coefficients. The tap coefficients are represented digitally and stored in registers. The highest weights will be for the nearest neighboring data samples to the current data sample and the weights will decrease for data samples that are farther removed in time (per arrival sequence) from the current data sample.

In the disclosed embodiments, formula(s) are used to evaluate the magnitude and polarity of the current data sample to determine if the current data sample would be subjected to a significantly large weighted correction during any subsequent equalization processing by a DA-based feed forward equalization processing block. If not, additional formulas evaluate the magnitudes and polarities of the neighboring data samples (i.e., the first pre-cursor data sample and the first post-cursor data sample) to determine if the sum of their respective weighted corrections, which would be required during any subsequent equalization processing by the DA-based feed forward equalization processing block, would be relatively small.

A large weighted correction for the current data sample is indicative of the current data sample being degraded to the point that it falls within one of the defined ellipse shapes of the optimal PAM-4 signal and, thereby requires equalization processing and, particularly, correction by the equalization processing block to ensure that it accurately represents the specific two-bit symbol transmitted within the data stream. A relatively small sum of the weighted corrections for the neighboring data samples is indicative of the current data sample being only slightly, if at all, degraded such that it falls outside the defined ellipse shapes of the optimal PAM-4 signal near the intended PAM-4 signal level (e.g., AN100, AN033, AP033 or AP100) and, thereby does not require equalization processing and, particularly, does not require correction by the equalization processing block to ensure that it accurately represents the specific two-bit symbol transmitted within the data stream.

For example, referring to FIGS. 7A-7B, a large weighted correction amount for the current data sample, as determined by the formulas, indicates that the current data sample will have a peak that falls within (e.g., between the top and bottom or bottom and top) of one of the defined ellipse shapes 701a-701c and, particularly, between Aln and Alp of the lower ellipse 701a, between Amn and Amp of the middle ellipse 701b, or between Aun and Aup of the upper ellipse 701c. A small sum of weighted corrections for neighboring data samples, as determined by the formulas, indicates that the current data sample has a peak that falls at or near a desired level outside of these defined ellipse shapes 701a-701c (i.e., at a desired level below Aln, between Alp and Amn, between Amp and Aun, or above Aup).

To ensure that the results of the formulas are accurate, optionally, the define ellipse shapes can be expanded, as shown in FIGS. 8A-8B to include conservative error margins and the set of formulas can be applied using the expanded ellipse shapes. In this case, a large weighted correction amount for the current data sample, as determined by the formulas, indicates that the current data sample will have a peak that falls within (e.g., between the top and bottom or bottom and top) of one of the defined ellipse shapes 801a-801c and, particularly, between Aln' and Alp' of the lower ellipse 801a, between Amn' and Amp' of the middle ellipse 801b, or between Aun' and Aup' of the upper ellipse 801c. A small sum of weighted corrections for neighboring data samples, as determined by the formulas, indicates that the current data sample has a peak that falls at or near a desired level outside of these defined ellipse shapes 701a-701c (i.e., at a desired level below Aln', between Alp' and Amn', between Amp' and Aun', or above Aup').

On-demand DA-based feed forward equalization processing will be performed with respect to all those data samples identified by the formulas as falling within the defined ellipse shapes 701a-701c (or, if applicable, the expanded ellipse shapes 801a-801c, which include the error margins). Other data samples may undergo equalization processing or may be "clipped" (i.e., may bypass equalization processing)

depending on whether they satisfy further filtering criteria set forth in the formulas, as described below.

The formulas used can be performed in real time on the received data samples and implemented using a screening logic block. That is, they can be performed by the screener 490, 590 fast enough to halt or enable DA-based feed forward equalization processing by the processing block 430, 530 without causing unacceptable performance overhead.

It should be noted that there are algorithms that perform channel assessment using training patterns to determine values for various coefficients across various circuits in the receive link at the time of power up. This includes the FFE tap coefficients. For the purpose of this system level algorithms, the DAFFE input and output are captured at regular intervals. This also includes the determination and continuous tuning of the values of the PAM levels such as Aln, Alp, Amn, Amp, Aun, Aup etc. This capture of DAFFE input and output data, at these regular time points is called snapshot. Hence it is important that the Screening Proposal described in this invention, does not affect the intended function of the snapshot based algorithm functions. Furthermore, since the snapshot data needs unclipped samples to determine the dimensions of the ellipse shapes (i.e., the dimensions of the eye patterns) used in various link algorithms, the scope of this invention needs to be outside the snapshot window (e.g., once in 256 UIs, i.e., C256 (i.e. Bit Rate divided by 256) is used for the snapshot). Since the FFE 500 operates at C8 (32 C8 cycles in one C256 cycle), setting aside 5 C8 cycles (1 for input snapshot, 1 for output snapshot, 3 cycles DAFFE latency) gives an opportunity of 32-5=27 FFE cycles (C8) for this proposal i.e. the power savings claimed by the proposal with full 32 C8 cycles needs deration by factor of 0.84 (=27/32). Also a loss of 10% (estimate) should be accounted for logic introduced by this proposal. So total deration=0.9*0.84=0.756 is applicable on the power estimate that didn't account for snapshot and added logic from this proposal.

To develop the required formulas, logic simulation of a core model including the channel model for degrading the PAM data samples outputs of the transmitter can be run. After the initial calibration algorithms settled, sequential input samples (e.g., 10000 samples) into the FFE can be collected. Since the latency of the FFE is known in terms of clock cycles, the FFE outputs corresponding to the inputs can also collected from the simulation. The data collected from simulation including the ellipse shape parameters (referred to below as eye metric values) relative to AN100 to AP100 can be mapped to values in the ADC range by correlating the ADC range to the (max-min) of these collected values. Specifically, calibration converged eye metric values can be determined for AN100, AN066, AN033, A000, AP033, AP066 and AP100. It should be noted that, while logic simulation is one way to determine a starting criteria, the on-chip channel assessment algorithms may be modified to tune the criteria variables regularly to adapt to changes in eye characteristics or channel characteristics due to temperature and other environment/use conditions.

Formula 1a can then be solved for AN100 through AP100 as follows so to map the ellipse metrics to the ADC range): the calibration converged ellipse metric values÷ Gain, where Gain=(AP100−AN100)/the ADC full range (e.g., 64).

Next, formula 1b can be solved as follows for AN100-AP100 to map the FFE outputs to the full ADC range: (FFE_OUT)/Gain, where Gain=(max(FFE_OUT)−min(FFE_OUT)/the ADC full range.

Next, formula 2 can be solved as follows to determine distance parameters D1-D5 and the error margin: ESF min (D1, D2, D3, D4, D5, D6), where ESF is the ellipse scale factor, where D1=adcALN-adcAN100, D2=adcAN033−adcALP, D3=adcAMN−adcAN033, D4=adcAP033−adcAMP, D5=adcAUN−adcAP033, and D6=adcAP100-adcAUP, and where each of the adc values are acquired from formula 1b. It should be noted that the ellipse scale factor (ESF) can be defined, for example, from 0.1 to 0.9 (e.g., 0.5) to set the size of the error margin. The smaller the ESF the smaller the error margin such that more number of input data samples will be clipped (i.e., will bypass equalization processing) and more power will be saved. The larger the ESF the greater the error margin such that less number of input samples will be clipped and less power will be saved. See discussion of formula 4 below.

Next, the following formulas 3a-3e and optionally 3f can be applied during screening. As discussed above, only the values of the first pre-cursor tap (i.e., PRE-CURSOR1), the first post-cursor tap (i.e., POST-CURSOR1) and the main cursor tap (i.e., MAINCURSOR) are employed, all other pre and post cursors are ignored.

Formulas 3a, the input is outside the ellipse by the margin:
(i): For MAINCURSOR Below the Lower Edge of an Ellipse, MAINCURSOR+MARGIN<Lower Edge of The Ellipse.
(ii): For MAINCURSOR Above the Upper Edge of an Ellipse, MAINCURSOR−MARGIN>Upper Edge of The Ellipse.

Formula 3b, the maximum of the correction components by PRE-CURSOR1 or POST-CURSOR1 that reduces output value i.e., opposite polarity to sign (MAINCURSOR)*sign (MAINCURSOR coefficient) is less than or equal to the Distance To The Ellipse Edge*Gain/CommonFilterMultiplier, where Gain=(max(FFE_OUT)−min(FFE_OUT))/the full ADC range (Formula 3e) and where the CommonFilterMultiplier=scaling factor to be tuned based on algorithm that checks for the best ellipse size at FFE output (see optional formula 3f below).

Formula 3c: abs(MAIN CURSOR)*2>abs(PRECURSOR1). This formula is to avoid extreme cases where MAINCURSOR is too small, while PRE-CURSOR1 is large.

Formula 3d: abs(MAIN CURSOR)*4>abs(POST-CURSOR1). This formula is to avoid extreme cases where MAINCURSOR is too small, while POST-CURSOR1 is large.

Formula 3e is an exemplary formula for the CommonFilterMultipler. However, it should be understood that this formula is offered for illustration purposes and can be tuned as necessary to balance out competing concerns of power savings and conservatism (e.g., a threshold bit error rate and, particularly, a maximum acceptable bit error rate). In this exemplary formula 3e:
[IF sign(PRE-CURSOR1 Coefficient) NOT EQUAL TO sign(MAINCURSOR coefficient){IF sign(PRE-CURSOR1 Coefficient) EQUAL TO sign(POST-CURSOR1 Coefficient) THEN CommonFilterMultiplier=0.125*sign(PRE-CURSOR1 Coefficient)*abs(max(PRE-CURSOR1 Coefficient,POST-CURSOR1 Coefficient))
ELSE CommonFilterMultiplier=0.125*abs(PRE-CURSOR1 Coefficient)}
ELSE{sign(POST-CURSOR1 Coefficient) NOT EQUAL TO sign(MAINCURSOR coefficient){IF sign(POST-CURSOR1 Coefficient) EQUAL TO sign(PRE-CURSOR1 Coefficient) THEN CommonFilterMultiplier=0.125*sign(POST-CURSOR1 Coefficient)*abs(max(POST-CURSOR1

Coefficient,PRE-CURSOR1 Coefficient)) ELSE CommonFilterMultiplier=0.125*abs(POST-CURSOR1 Coefficient)}].

As mentioned above, the ellipse scale factor (ESF) can be defined, for example, from 0.1 to 0.9 (e.g., 0.5) to set the size of the error margin. The smaller the ESF the smaller the error margin such that more number of input data samples will be clipped (i.e., will bypass equalization processing) and more power will be saved. The larger the ESF the greater the error margin such that less number of input data samples will be clipped and less power will be saved. That is, reducing the ESF factor reduces the size of the margin and brings the outer edges of the ellipse shapes 801a-801c in FIG. 8A closer to the ellipse shapes 701a-701c (for example, reducing the value of Aup by the scaling factor to bring it closer to AP066). Since the margin is defined relative to the edges (e.g., Aup, Aun) of the data ellipse, this would also shrink the outer edges of the margin. This in turn will increase the number of samples available outside the margin, thereby giving more opportunity to save power.

It should be understood that, depending upon the accuracy of screening formulas 1a-b, 2, 3a-f, a design may choose to avoid reducing the ESF too much in order to ensure that all impulse responses that need to be corrected will be subjected to the DA-based feed forward equalization processing. That is, the design must balance the need for power savings with the need for accuracy.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A feed forward equalizer comprising:
   a retimer receiving digital words from analog-to-digital converters at successive unit intervals, the digital words representing a data stream and indicating different signal levels at different taps on a transmission medium;
   a screener evaluating a data sample from the data stream by analyzing selected ones of the digital words and, based on results of the evaluating, setting a bypass flag to either a first level or a second level; and
   a distributed arithmetic-based feed forward equalization processing block,
   wherein the first level causes distributed arithmetic-based feed forward equalization processing of the data sample to be performed by the feed forward equalization processing block, and
   wherein the second level causes the distributed arithmetic-based feed forward equalization processing of the data sample by the feed forward equalization processing block to be bypassed.

2. The feed forward equalizer of claim 1,
   wherein the evaluating comprises applying a set of formulas to determine where the data sample falls relative to defined ellipse shapes of a level-4 pulse amplitude modulation signal pattern,
   wherein the bypass flag is set to the first level when the results of the evaluating indicate that the data sample falls inside one of the defined ellipse shapes, and
   wherein the bypass flag is set to the second level when the results of the evaluating indicate that the data sample falls outside the defined ellipse shapes.

3. The feed forward equalizer of claim 2, wherein each defined ellipse shape comprises a margin and wherein a size of the margin is adjustable to balance power consumption with a threshold bit error rate.

4. The feed forward equalizer of claim 1,
   wherein the different signal levels correspond to a main cursor tap, multiple pre-cursor taps and multiple post-cursor taps, and
   wherein the selected ones of the digital words represent signal levels on at least the main cursor tap, a first pre-cursor tap adjacent to the main cursor tap and a first post-cursor tap adjacent to the main cursor tap.

5. The feed forward equalizer of claim 1, further comprising: additional logic downstream of the feed forward equalization processing block; and a fixed value register inserting a fixed value digital word into the additional logic when the bypass flag is at the second level, wherein the fixed value digital word corresponds to a predetermined acceptable level-4 pulse amplitude modulation (PAM-4) signal level.

6. The feed forward equalizer of claim 1,
   wherein timing of the feed forward equalization processing block is controlled by a clock circuit with a clock transition skip function, and wherein, when the bypass flag is at the second level, the clock transition skip function is triggered and an output data value from the feed forward equalization processing block is held constant.

7. A feed forward equalizer comprising:
a distributed arithmetic-based feed forward equalization processing block comprising:
a first processing section comprising a first address generator; and
a second processing section comprising a second address generator;
a retimer receiving digital words from analog-to-digital converters at successive unit intervals, the digital words representing a data stream and indicating different signal levels at different taps on a transmission medium,
wherein the retimer holds the digital words until a first eight digital words are received and then outputs the first eight digital words to the first address generator, and
wherein the retimer again holds the digital words until a next eight digital words are received and then outputs the next eight digital words to the second address generator; and
a screener evaluating a data sample from the data stream by analyzing selected ones of the first eight digital words and, based on results of the evaluating, setting a bypass flag to either a first level or a second level,
wherein the first level causes distributed arithmetic-based feed forward equalization processing of the data sample to be performed by the first processing section and the second processing section in combination, and
wherein the second level causes the distributed arithmetic-based feed forward equalization processing of the data sample to be bypassed.

8. The feed forward equalizer of claim 7,
wherein the evaluating comprises applying a set of formulas to determine where the data sample falls relative to defined ellipse shapes of a level-4 pulse amplitude modulation signal pattern,
wherein the bypass flag is set to the first level when the results of the evaluating indicate that the data sample falls inside one of the defined ellipse shapes, and
wherein the bypass flag is set to the second level when the results of the evaluating indicate that the data sample falls outside the defined ellipse shapes.

9. The feed forward equalizer of claim 8, wherein the defined ellipse shapes comprise a margin and wherein a size of the margin is adjustable to balance power consumption with a threshold bit error rate.

10. The feed forward equalizer of claim 7,
wherein the different signal levels correspond to a main cursor tap, multiple pre-cursor taps and multiple post-cursor taps, and
wherein the selected ones of the digital words represent signal levels on at least the main cursor tap, a first pre-cursor tap adjacent to the main cursor tap and a first post-cursor tap adjacent to the main cursor tap.

11. The feed forward equalizer of claim 7,
wherein the first address generator receives the first eight digital words, generates first addresses using a first four of the first eight digital words and generates second addresses using a second four of the first eight digital words,
wherein the first processing section further comprises:
a first distributed arithmetic look-up table storing first possible output comes for first sum of partial products computations of a distributed arithmetic look-up table;
first access logic blocks operably connected to the first distributed arithmetic look-up table and receiving the bypass flag and the first addresses;
a second distributed arithmetic look-up table storing second possible output comes for second sum of partial products computations; and
second access logic blocks operably connected to the second distributed arithmetic look-up table and receiving the bypass flag and the second addresses,
wherein the second address generator receives the next eight digital words, generates third addresses using a first four of the next eight digital words and generates fourth addresses using a second four of the next eight digital words,
wherein the second processing section comprises:
a third distributed arithmetic look-up table storing third possible output comes for third sum of partial products computations;
third access logic blocks operably connected to the third distributed arithmetic look-up table and receiving the bypass flag and the third addresses;
a fourth distributed arithmetic look-up table storing fourth possible output comes for fourth sum of partial products computations;
fourth access logic blocks operably connected to the fourth distributed arithmetic look-up table and receiving the bypass flag and the fourth addresses; and
a second address generator receiving the next eight digital words,
wherein each access logic block receiving an address from an address generator and the bypass flag, acquires and outputs a sum of partial products value from a look-up table only when the bypass flag is at the first level, and halts access to the look-up table when the bypass flag is at the second level.

12. The feed forward equalizer of claim 11,
wherein all distributed arithmetic look-up tables are in offset binary format,
wherein the first processing section further comprises: a first offset register; and a first adder, wherein the first adder computes a total sum of a first offset value acquired from the first offset register and all sum of partial products values acquired from the first distributed arithmetic look-up table and the second distributed arithmetic look-up table when the bypass flag is at the first level,
wherein the second processing section further comprises: a second offset register; and a second adder, wherein the second adder computes a total sum of a second offset value acquired from the second offset register and all sum of partial products values acquired from the third distributed arithmetic look-up table and the fourth distributed arithmetic look-up table when the bypass flag is at the first level, and
wherein the feed forward equalization processing block further comprises a third adder that computes a sum of addends from the first adder and the second adder.

13. The feed forward equalizer of claim 7, further comprising: additional logic downstream of the feed forward equalization processing block; and a fixed value register inserting a fixed value digital word into the additional logic when the bypass flag is at the second level, wherein the fixed value digital word corresponds to a predetermined acceptable level-4 pulse amplitude modulation (PAM-4) signal level.

14. The feed forward equalizer of claim 7,
wherein timing of the feed forward equalization processing block is controlled by a clock circuit with a clock transition skip function, and
wherein, when the bypass flag is at the second level, the clock transition skip function is triggered and an output data value from the feed forward equalization processing block is held constant.

15. A feed forward equalization method comprising:
receiving digital words from analog-to-digital converters, the digital words representing a data stream and indicating different signal levels at different taps on a transmission medium;
evaluating a data sample from the data stream by analyzing selected ones of the digital words;
based on results of the evaluating, setting a bypass flag to either a first level or a second level;
when the bypass flag is at the first level using a distributed-based feed forward equalization processing block to perform distributed arithmetic-based feed forward equalization processing of the data sample; and
when the bypass flag is at the second level, bypassing performance of the distributed arithmetic-based feed forward equalization processing of the data sample.

16. The method of claim 15,
wherein the evaluating comprises applying a set of formulas to determine where the data sample falls relative to defined ellipse shapes of a level-4 pulse amplitude modulation signal pattern,
wherein the bypass flag is set to the first level when the results of the evaluating indicate that the data sample inside one of the defined ellipse shapes, and
wherein the bypass flag is set to the second level when the results of the evaluating indicate that the data sample falls outside the defined ellipse shapes.

17. The method of claim 16, wherein each defined ellipse shape comprises a margin and wherein the method comprises selectively adjusting a size of the margin to balance power consumption with a threshold bit error rate.

18. The method of claim 15,
wherein the different signal levels correspond to a main cursor tap, multiple pre-cursor taps and multiple post-cursor taps, and
wherein the selected ones of the digital words represent signal levels on at least the main cursor tap, a first pre-cursor tap adjacent to the main cursor tap and a first post-cursor tap adjacent to the main cursor tap.

19. The method of claim 15, further comprising, when the bypass flag is at the second level, inserting a fixed value digital word into additional logic downstream from the feed forward equalization processing block, wherein the fixed value digital word corresponds to a predetermined acceptable level-4 pulse amplitude modulation (PAM-4) signal level.

20. The method of claim 15, further comprising, when the bypass flag is at the second level, holding an output data value from the feed forward equalization processing block constant and triggering a clock transition skip function of a clock circuit that controls timing of the feed forward equalization processing block.

* * * * *